United States Patent
Sugano et al.

(10) Patent No.: US 10,542,571 B2
(45) Date of Patent: Jan. 21, 2020

(54) WIRELESS COMMUNICATION APPARATUS, WIRELESS COMMUNICATION METHOD, AND COMPUTER READABLE STORAGE MEDIUM

(71) Applicant: FUJITSU LIMITED, Kawasaki-shi, Kanagawa (JP)

(72) Inventors: Hiroyasu Sugano, Koto (JP); Eiichi Takahashi, Kawasaki (JP); Junichi Yura, Kawasaki (JP); Akira Shiba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/473,195

(22) Filed: Mar. 29, 2017

(65) Prior Publication Data
US 2017/0290073 A1    Oct. 5, 2017

(30) Foreign Application Priority Data

Mar. 30, 2016  (JP) ................. 2016-069704

(51) Int. Cl.
*H04W 76/10*    (2018.01)
*G08B 7/06*    (2006.01)

(52) U.S. Cl.
CPC ............. *H04W 76/10* (2018.02); *G08B 7/06* (2013.01)

(58) Field of Classification Search
CPC ............................. H04W 76/10; G08B 7/06
See application file for complete search history.

(56) References Cited

U.S. PATENT DOCUMENTS

| | | | |
|---|---|---|---|
| 9,635,278 B2* | 4/2017 | Oshima | H04N 5/3532 |
| 2005/0182876 A1* | 8/2005 | Kim | G06F 13/385 |
| | | | 710/100 |
| 2005/0210517 A1 | 9/2005 | Hirose et al. | |
| 2006/0221863 A1* | 10/2006 | Ishimoto | G06F 3/1206 |
| | | | 370/254 |
| 2007/0173291 A1 | 7/2007 | Morotomi | |
| 2008/0113618 A1* | 5/2008 | De Leon | H04M 1/7253 |
| | | | 455/41.2 |

(Continued)

FOREIGN PATENT DOCUMENTS

| | | |
|---|---|---|
| JP | 2005-276165 A | 10/2005 |
| JP | 2006-005416 A | 1/2006 |

(Continued)

OTHER PUBLICATIONS

Japanese Office Action dated Sep. 3, 2019, issued in corresponding Japanese Patent Application No. 2016-069704.

*Primary Examiner* — Habte Mered
(74) *Attorney, Agent, or Firm* — Xsensus LLP

(57) ABSTRACT

A wireless communication apparatus including: a specified output device, and a processor coupled to the specified output device and configured to: establish a wireless connection between the wireless communication apparatus and another wireless communication apparatus, and control the specified output device to output an output pattern that is substantially shared with the other wireless communication apparatus so that a corresponding output pattern of the output pattern is output by another specified output device of the other wireless communication apparatus.

14 Claims, 21 Drawing Sheets

(56) References Cited

U.S. PATENT DOCUMENTS

| | | | | |
|---|---|---|---|---|
| 2012/0304268 | A1* | 11/2012 | Komori | G06F 21/36 726/7 |
| 2013/0165098 | A1* | 6/2013 | Nakazawa | H04W 4/026 455/418 |
| 2013/0332114 | A1* | 12/2013 | Dasu | G01D 21/00 702/189 |
| 2015/0022370 | A1* | 1/2015 | Dureau | G08B 5/36 340/815.4 |
| 2015/0327006 | A1* | 11/2015 | Chiou | H04W 4/02 455/456.1 |
| 2016/0057553 | A1* | 2/2016 | Ryu | H04M 1/6066 340/4.41 |
| 2016/0294485 | A1* | 10/2016 | Ma | H04W 76/14 |
| 2017/0127462 | A1* | 5/2017 | Liu | H04W 76/14 |
| 2017/0187828 | A1* | 6/2017 | Soji | G06F 1/3278 |

FOREIGN PATENT DOCUMENTS

| | | |
|---|---|---|
| JP | 2007-130934 A | 7/2007 |
| JP | 2007-180852 A | 7/2007 |
| JP | 2012-216926 A | 11/2012 |
| JP | 2014-203153 A | 10/2014 |

* cited by examiner

FIG. 7

| TYPE | BASIC ATTRIBUTE INFORMATION ~700 | |
|---|---|---|
| | OUTPUT ATTRIBUTE | |
| | COLOR ATTRIBUTE | SOUND ATTRIBUTE |
| NORMAL TIME | blue | LOW-PITCHED SOUND |
| DURING PROCESSING | green | MIDDLE-PITCHED SOUND |
| ABNORMAL TIME | red | HIGH-PITCHED SOUND |

WIRELESS COMMUNICATION APPARATUS, WIRELESS COMMUNICATION METHOD, AND COMPUTER READABLE STORAGE MEDIUM

CROSS-REFERENCE TO RELATED APPLICATION

This application is based upon and claims the benefit of priority of the prior Japanese Patent Application No. 2016-069704, filed on Mar. 30, 2016, the entire contents of which are incorporated herein by reference.

FIELD

The embodiments discussed herein are related to an information processing apparatus, an information processing system, an information processing method, and an information processing program.

BACKGROUND

In recent years, various devices have been provided with a wireless function and can be connected to a network, and a world of Internet of Things (IoT) is being realized. In addition, various devices are mutually wirelessly connected, and the connected devices implement respective functions and are expected to provide values wanted by users.

As a related-art technology, for example, an augmented reality (AR) technology has been used to visualize information of a network connection state of an electronic device. In addition, a technology has been proposed with which a connection relationship between nodes in a wireless network can be visually recognized and displayed on an image on a display unit. Moreover, a technology has been proposed with which a light control unit is controlled in accordance with an operation state of a detected information communication terminal, and a light emitting unit is caused to emit light in a predetermined color and luminance and to gradually increase or gradually decrease the light emission luminance.

For example, Japanese Laid-open Patent Publication No. 2014-203153, Japanese Laid-open Patent Publication No. 2012-216926, Japanese Laid-open Patent Publication No. 2006-5416, and Japanese Laid-open Patent Publication No. 2007-180934 are described as related-art technologies.

SUMMARY

According to an aspect of the invention, a wireless communication apparatus includes a specified output device, and a processor coupled to the specified output device and configured to: establish a wireless connection between the wireless communication apparatus and another wireless communication apparatus, and control the specified output device to output an output pattern that is substantially shared with the other wireless communication apparatus so that a corresponding output pattern of the output pattern is output by another specified output device of the other wireless communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an explanatory diagram illustrating a specific example of basic attribute information;

DESCRIPTION OF EMBODIMENTS

However, according to a related-art technology, a problem occurs that it is difficult to present a connection relationship and a connection state between wirelessly connected devices in an easily understandable manner.

According to an aspect, the present disclosure provides an information processing apparatus that presents the connection relationship and the connection state between the wirelessly connected devices in an easily understandable manner, an information processing system, an information processing method, and an information processing program.

Hereinafter, with reference to the drawings, an information processing apparatus, an information processing system, an information processing method, and an information processing program according to exemplary embodiments of the present disclosure will be described in detail.

First Exemplary Embodiment

Figure 1:
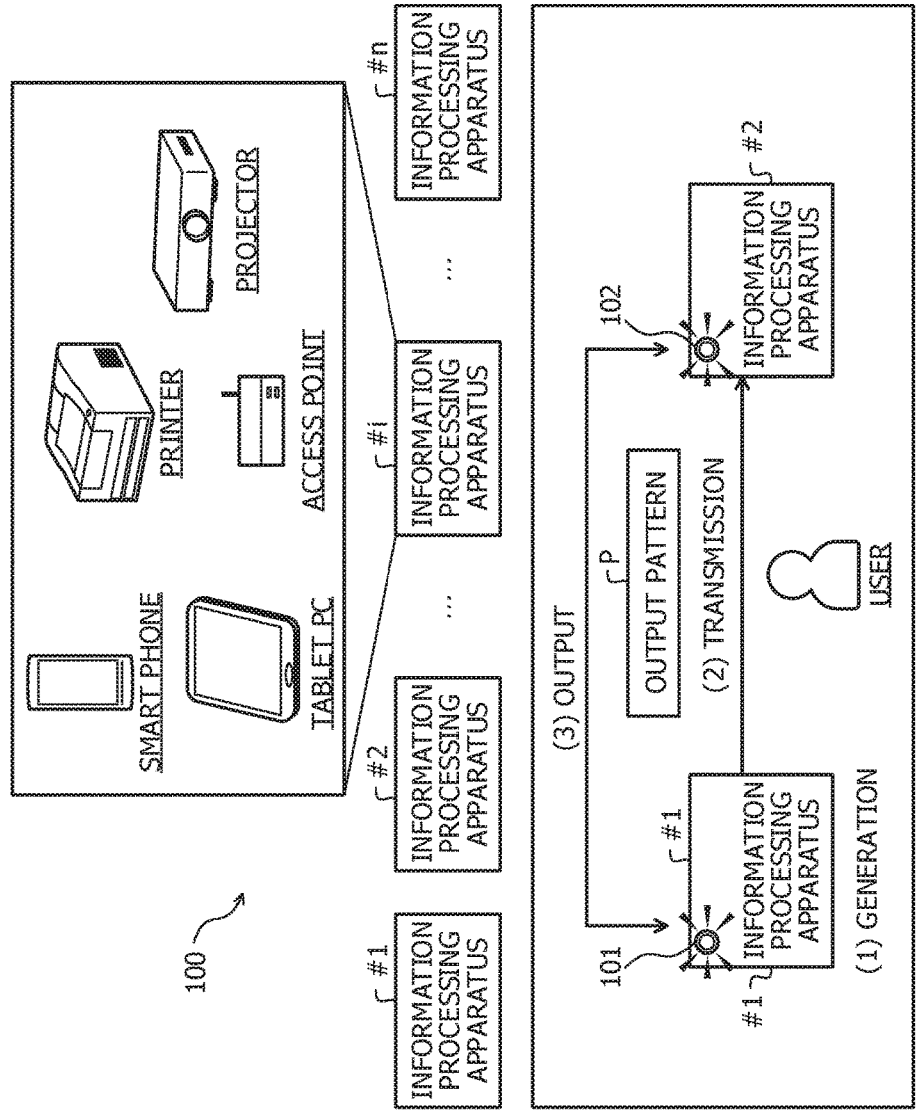
FIG. 1 is an explanatory diagram illustrating an example of an information processing method according to a first exemplary embodiment.

FIG. 1 is an explanatory diagram illustrating an example of an information processing method according to a first exemplary embodiment. In FIG. 1, an information processing system 100 includes information processing apparatuses #1 to #n (n: a natural number higher than or equal to 2). The respective information processing apparatuses #1 to #n are wirelessly communicable computers that can be wirelessly connected to one another.

In addition, the respective information processing apparatuses #1 to #n include an output apparatus configured to output various information (for example, an output apparatus 305 illustrated below in FIG. 3). The output apparatus is, for example, a light emitting diode (LED), a liquid crystal panel, a speaker, or the like. Wireless communications performed by the respective information processing apparatuses #1 to #n include, for example, communications using a wireless local area network (LAN), Bluetooth (registered trademark), and the like.

Specifically, for example, the information processing apparatuses #1 to #n are various types of electronic devices such as a tablet terminal, a smart phone, a laptop personal computer (PC), a printer, a display, a projector, a household electric device, and a wireless access point.

In the following descriptions, an arbitrary information processing apparatus among the information processing apparatuses #1 to #n may be referred to as an "information processing apparatus #i" in some cases (i=1, 2, . . . , n). In addition, another information processing apparatus different from the information processing apparatus #i among the information processing apparatuses #1 to #n may be referred to as an "information processing apparatus #j" in some cases (j≠i, j=1, 2, . . . , n).

At this time, in the world of IoT where the wireless communication is a presupposition, it is difficult for a user to grasp the connection relationship and the connection state between the devices in many cases. For example, many of IoT-compatible devices are not provided with a unit configured to clearly indicate a state in which a connection is correctly established or data transmitted after the connection is correctly processed. For this reason, even when the user instructs a connection between a certain device and another device, there are cases where the user does not clearly find that an expected operation is performed between the devices.

It is noted that it is conceivable that the connection state with the other device is displayed on a liquid crystal panel, an LED, or the like as a standalone device (that is, one of the wirelessly connected devices). However, when a previously programmed state is merely displayed by a previously programmed display method as the standalone device, a display content is not only static but also insufficient to indicate the connection state between the devices.

In view of the above, according to the present exemplary embodiment, an information processing method of generating an output pattern corresponding to the connection state between the information processing apparatuses #i and #j and causing both the information processing apparatuses #i and #j to perform output in accordance with a timing indicated by the generated output pattern will be described. Hereinafter, a processing example of the information processing system 100 will be described.

(1) The information processing apparatus #i generates an output pattern P corresponding to a connection state with the other wirelessly connected information processing apparatus #j. Herein, the connection state with the other information processing apparatus #j indicates a state of the wireless connection with the other information processing apparatus #j and a state of processing performed with the other information processing apparatus #j. In addition, the output pattern P refers to information indicates an output timing corresponding to the connection state with the other information processing apparatus #j.

In the example of FIG. 1, a case will be supposed where the information processing apparatus #1 and the information processing apparatus #2 are wirelessly connected to each other among the information processing apparatuses #1 to #n in the information processing system 100. In this case, for example, the information processing apparatus #1 generates the output pattern P corresponding to the connection state with the other wirelessly connected information processing apparatus #2.

Here, a specific example of the output pattern P will be described with reference to FIG. 2.

Figure 2:
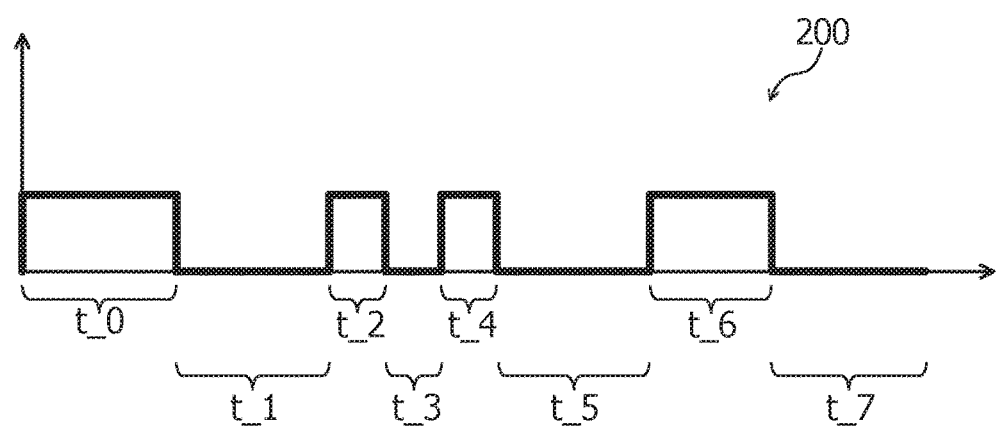
FIG. 2 is an explanatory diagram illustrating a specific example of an output pattern.

FIG. 2 is an explanatory diagram illustrating the specific example of the output pattern P. In FIG. 2, a timing chart 200 represents output timings indicated by the output pattern P corresponding to the connection state between the wirelessly connected information processing apparatuses #1 and #2 on a time axis.

In FIG. 2, $t\_x$ (x=0, 1, . . . ) indicates a time length, and $t\_x$ where x is an even number (including 0) indicates a timing when output is performed. On the other hand, $t\_x$ where x is an odd number indicates a timing when output is not performed. That is, the output pattern P indicates a pattern in which output is first performed continuously for a time length of $t\_0$, and thereafter, output is not performed continuously for a time length of $t\_1$.

(2) The information processing apparatus #i transmits the generated output pattern P to the other information processing apparatus #j. In the example of FIG. 1, the information processing apparatus #1 transmits the generated output pattern P to the other information processing apparatus #2. With this configuration, both the information processing apparatuses #1 and #2 can share the output pattern P corresponding to the connection state between the information processing apparatuses #1 and #2.

(3) The information processing apparatus #i causes the other information processing apparatus #j to perform the output in accordance with the timing indicated by the output pattern P, and also the information processing apparatus #i performs the output in accordance with the timing indicated by the output pattern P in its own apparatus. Specifically, for example, the information processing apparatus #i transmits the output instruction of the output pattern P to the other information processing apparatus #j.

Subsequently, in response to the transmission of the output instruction of the output pattern P, the information processing apparatus #i performs the output in accordance with the timing indicated by the output pattern P in its own apparatus. On the other hand, in response to the reception of the output instruction of the output pattern P, the other information processing apparatus #j performs the output in accordance with the timing indicated by the output pattern P in its own apparatus.

With this configuration, it is possible to perform the output in accordance with the timing indicated by the output pattern P corresponding to the connection state between the wirelessly connected information processing apparatuses #i and #j in both the information processing apparatuses #i and #j. It is noted that the output instruction of the output pattern P may be transmitted in synchronism with the transmission of the output pattern P to the other information processing apparatus #j, for example.

In the example of FIG. 1, a case will be supposed where the information processing apparatuses #1 and #2 respectively include LEDs 101 and 102 as output apparatuses. In this case, the information processing apparatuses #1 and #2 respectively cause the LEDs 101 and 102 to emit light in accordance with the output timings indicated by the output pattern P corresponding to the connection state between the wirelessly connected information processing apparatuses #1 and #2.

As described above, according to the information processing apparatus #i, it is possible to generate the output pattern P corresponding to the connection state with the other wirelessly connected information processing apparatus #j. In addition, according to the information processing apparatus #i, the generated output pattern P is transmitted to the other information processing apparatus #j to cause the other information processing apparatus #j to perform the output in accordance with the timing indicated by the output pattern P, and also the information processing apparatus #i can perform the output in accordance with the timing indicated by the output pattern P in its own apparatus.

That is, it is possible to perform the output in accordance with the timing indicated by the output pattern P corresponding to the connection state between the information processing apparatuses #i and #j in both the wirelessly connected information processing apparatuses #i and #j. With this configuration, while the connection state between the wirelessly connected information processing apparatuses #i and #j is visualized, it is possible to present the connection relationship and the connection state between the information processing apparatuses #i and #j in an easily understandable manner.

In the example of FIG. 1, the user checks lighting patterns of the LEDs 101 and 102 of the respective information processing apparatuses #1 and #2, so that it is possible to grasp the connection relationship and the connection state between the information processing apparatuses #1 and #2. With this configuration, the user can grasp the state in which the connection between the information processing apparatuses #1 and #2 is correctly established and data transmitted after the connection is correctly processed, for example, and it is possible to check that the expected operation is performed between the information processing apparatuses #1 and #2. In addition, for example, the user can easily discriminate the actually wirelessly connected information processing apparatuses #1 and #2 even in a situation in which a plurality of information processing apparatuses that can be mutually wirelessly connected are arranged side by side.

Hardware Configuration Example of the Information Processing Apparatus #i

Next, a hardware configuration example of the information processing apparatus #i will be described.

Figure 3:
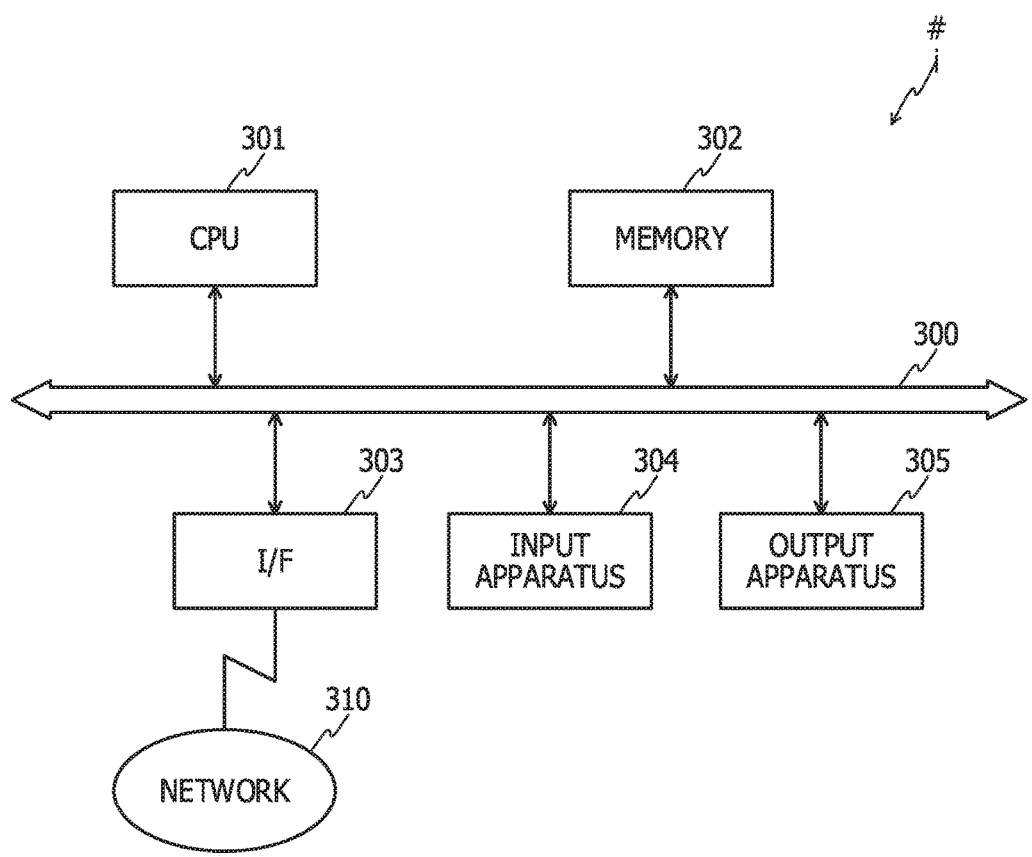
FIG. 3 is a block diagram illustrating a hardware configuration example of an information processing apparatus.

FIG. 3 is a block diagram illustrating the hardware configuration example of the information processing apparatus #i. In FIG. 3, the information processing apparatus #i includes a central processing unit (CPU) 301, a memory 302, an interface (I/F) 303, an input apparatus 304, and the output apparatus 305. In addition, the respective components are connected to one another by a bus 300.

Herein, the CPU 301 governs control of the entirety of the information processing apparatus #i. The memory 302 includes, for example, a read only memory (ROM), a random access memory (RAM), a flash ROM, and the like. Specifically, for example, the flash ROM or the ROM stores various programs, and the RAM is used as a work area of the CPU 301. The programs stored in the memory 302 are loaded to the CPU 301, so that the CPU 301 is caused to execute coded processing.

The I/F 303 is connected to a network 310 and is connected to an external computer (for example, the other information processing apparatus #j) via the network 310. Subsequently, the I/F 303 governs an interface between the network 310 and an internal part of the apparatus and controls input and output of data from the external computer. The network 310 is, for example, a short-range wireless network. It is however noted that a configuration may be adopted in which the information processing apparatus #i can be connected to another computer via the internet, a LAN, a wide area network (WAN), or the like.

The input apparatus 304 includes keys for inputting characters, numerals, various instructions, and the like and performs data input. The input apparatus 304 may be, for example, a key board, a mouse, or the like. Alternatively, the input apparatus 304 may be an input pad of a touch panel style, a numerical keypad, or the like.

The output apparatus 305 performs data output. The output apparatus 305 is, for example, an LED, a liquid crystal panel, a display, a speaker, or the like. It is noted that the information processing apparatus #i may also include, for example, a disk drive, a disk, a solid state drive (SSD), or the like, in addition to the above-mentioned components.

Storage Content of a Connection State Management DB 400

Next, a storage content of the connection state management data base (DB) 400 in each of the information processing apparatuses #i will be described. The connection state management DB 400 is stored, for example, in the memory 302 illustrated in FIG. 3.

Figure 4:
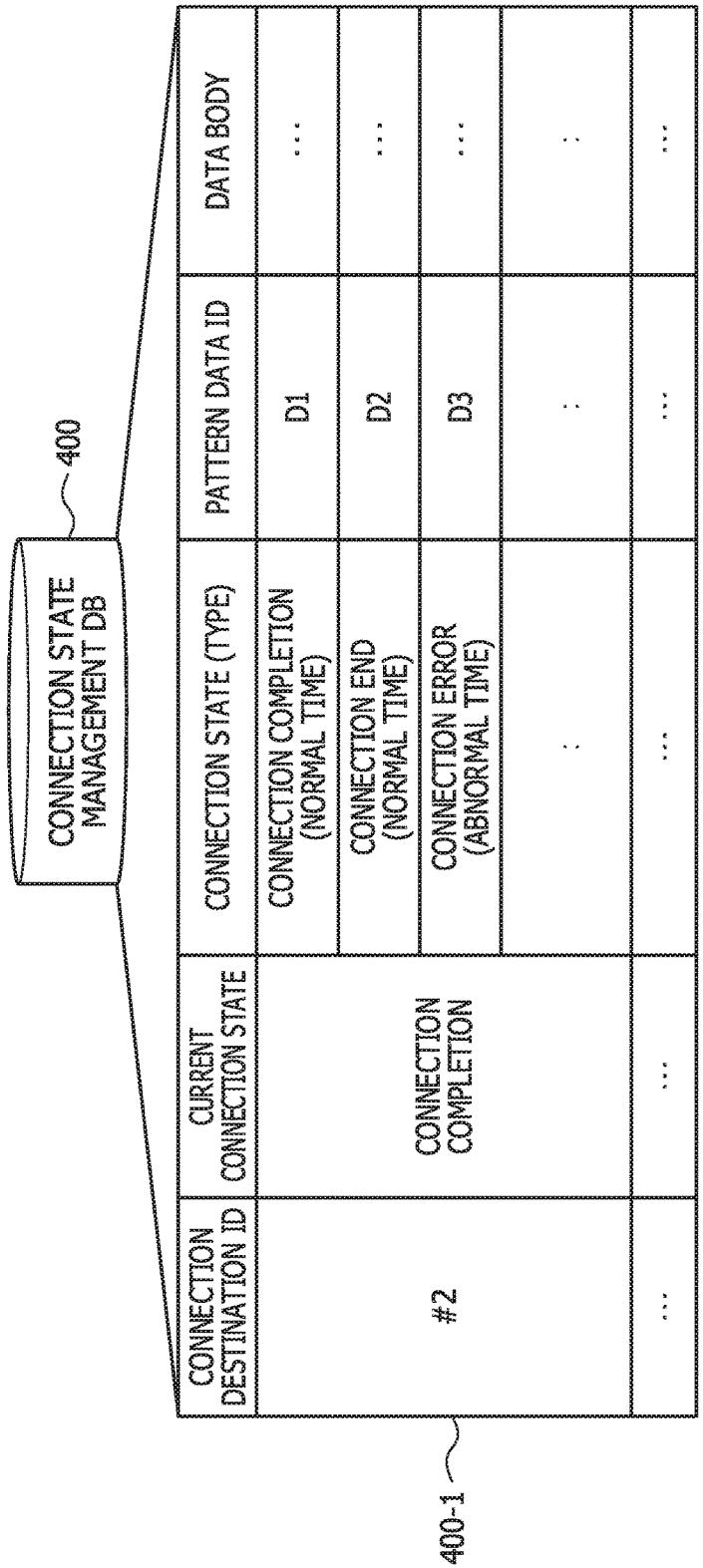
FIG. 4 is an explanatory diagram illustrating an example of a storage content of a connection state management data base (DB)

FIG. 4 is an explanatory diagram illustrating an example of the storage content of the connection state management DB 400. In FIG. 4, the connection state management DB 400 includes fields of a connection destination ID, a current connection state, a connection state (type), a pattern data ID, and a data body and sets information in the respective fields, so that connection state management information (for example, connection state management information 400-1) is stored as a record.

Herein, the connection destination ID is an identifier for uniquely identifying the other information processing apparatus #j corresponding to a connection destination. As the connection destination ID, for example, a media access control (MAC) address of the other information processing apparatus #j can be used. The current connection state refers to a current connection state with the other information processing apparatus #j.

The connection state (type) indicates a connection state between the information processing apparatuses #i and #j. The (type) indicates a type of an event functioning as a trigger for transition to this connection state and includes, for example, normal time, abnormal time, during processing, and the like. The connection state (normal time) indicates a connection state transited while an event at a normal time occurs as the trigger. The connection state (abnormal time) indicates a connection state transited while an event at an abnormal time occurs as the trigger. The connection state (during processing) indicates a connection state transited while an event during processing occurs as the trigger.

The connection state (type) includes, for example, connection completion (normal time), connection end (normal time), connection error (abnormal time), data transmission start (during processing), data transmission end (during processing), opposite device processing start (during processing), opposite device processing end (during processing), opposite device error occurrence (abnormal time), and the like.

The pattern data ID is an identifier for uniquely identifying pattern data D. The pattern data D is information including the output pattern P corresponding to the connection state between the information processing apparatuses #1 and #j. The data body is a data body of the pattern data D corresponding to the pattern data ID. It is noted that a specific example of the pattern data D will be described below with reference to FIG. 6.

Functional Configuration Example of the Information Processing Apparatus #i

Figure 5:
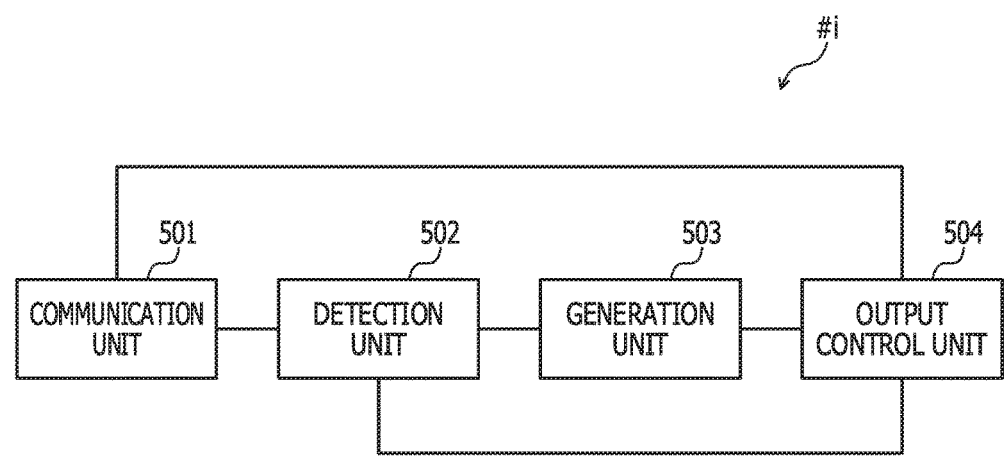
FIG. 5 is a block diagram illustrating a functional configuration example of the information processing apparatus.

FIG. 5 is a block diagram illustrating a functional configuration example of the information processing apparatus #i. In FIG. 5, the information processing apparatus #i has a configuration including a communication unit 501, a detection unit 502, a generation unit 503, and an output control unit 504. The detection unit 502, the generation unit 503, and the output control unit 504 are functions operating as a control unit, and specifically, for example, the functions are realized while the programs stored in the memory 302 illustrated in FIG. 3 are executed by the CPU 301. In addition, a function of the communication unit 501 is realized, for example, by the I/F 303 illustrated in FIG. 3. The processing results of the respective function units are stored, for example, in the memory 302.

The communication unit 501 has a function of wirelessly communicating with the other wirelessly communicable information processing apparatus #j. Specifically, for example, when the other wirelessly communicable information processing apparatus #j is detected, the communication unit 501 performs connection processing between the information processing apparatuses #i and #j and establishes a wireless connection with the other information processing apparatus #j.

It is noted that the connection processing with the other wirelessly communicable information processing apparatus #j may be automatically performed or may also be manually performed. For example, the information processing apparatus #i may display a confirmation menu (for example, a window or a toast menu) when the other information processing apparatus #j is detected so that the connection processing with the other information processing apparatus #j can be manually performed.

The detection unit 502 detects the connection state with the other information processing apparatus #j. Specifically, for example, when the connection with the other information processing apparatus #j succeeds, the detection unit 502 detects the connection state "connection completion" indicating that the information processing apparatuses #i and #j are normally connected to each other. In a case where, for example, an event that serves as the trigger for the transition of the connection state with the other information processing apparatus #j occurs, the detection unit 502 detects the connection state with the other information processing apparatus #j which is identified from the above-mentioned event.

The detected connection state is stored, for example, in the connection state management DB 400 illustrated in FIG. 4. As an example of the case where the connection state "connection completion" with the other information processing apparatus #j is detected, the detection unit 502 respectively sets "#j" and "connection completion" in the fields of the connection destination ID and the current connection state the connection state management DB 400. With this configuration, new connection state management information is stored as a record. It is however noted that no settings have been made in the other fields at this time.

The generation unit 503 generates the pattern data D corresponding to the connection state with the other wirelessly connected information processing apparatus #j. Herein, the pattern data D is information including the output pattern P corresponding to the connection state with the other information processing apparatus #j. The pattern data D may include, for example, information indicating a type of the output apparatus 305 corresponding to the output pattern P in addition to the output pattern P.

That is, the information indicating the type of the output apparatus 305 indicates from which type of the output apparatus 305 the output in accordance with the timing indicated by the output pattern P is performed. The types of the output apparatus 305 include, for example, led (corresponding to the LED), sound (corresponding to the speaker), disd (corresponding to the liquid crystal panel, the display, or the like), and the like.

In addition, the pattern data D may include, for example, information of a duration indicating a time for which the output pattern P is kept to be output. The duration is set, for example, as an arbitrary time longer than a pattern length of the output pattern P. The pattern length is a time length of the output pattern P. The output pattern P is repeatedly output in this duration.

Moreover, the output pattern P may include information of an output attribute. Herein, the output attribute refers to an attribute of an output relying on the type of the output apparatus 305 and includes, for example, a color attribute, a sound attribute, and the like. For example, in a case where the type of the output apparatus 305 is "led", the output attribute is the color attribute such as RGB values (for example, [00, FF, A8]) representing a light emission color of the LED or a color name (for example, blue, magenta, or the like). In a case where the type of the output apparatus 305 is "sound", the output attribute is the sound attribute such as a tone color of the sound output from the speaker or a sound file name (for example, a way file name or an ogg file name).

Here, an example of a specific processing content of the generation unit 503 when the pattern data D is generated will be described with reference to FIG. 6.

Figure 6:
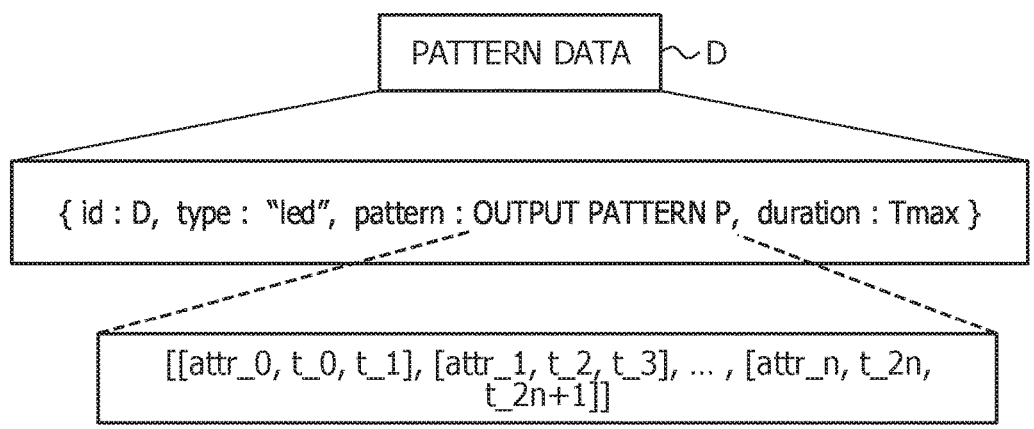
FIG. 6 is an explanatory diagram illustrating a specific example of pattern data.

FIG. 6 is an explanatory diagram illustrating a specific example of the pattern data D. In FIG. 6, the pattern data D includes id, type, pattern, and duration. The id indicates the pattern data ID for uniquely identifying the pattern data D. The type indicates the type of the output apparatus 305 corresponding to the output pattern P. The pattern indicates the output pattern P. The duration indicates the duration of the output pattern P.

First, the generation unit 503 sets the id, type, and duration of the pattern data D. For this id, for example, a number is serially allocated. One of the types related to the output apparatus 305 of the information processing apparatus #i is set as the type. In the example of FIG. 6, the id "D", the type "led", and the duration "$T_{max}$" are set.

Next, the generation unit 503 sets the output attribute of the output pattern P in accordance with the type of the output apparatus 305, for example. Specifically, for example, the generation unit 503 may refer to basic attribute information 700 illustrated in FIG. 7 to set the output attribute of the output pattern P.

FIG. 7 is an explanatory diagram illustrating a specific example of the basic attribute information 700. In FIG. 7, the basic attribute information 700 is information indicating the output attribute (color attribute, sound attribute) corresponding to the type of the connection state between the information processing apparatuses #i and #j. For example, "led" is set as the type of the output apparatus 305 (type), and "normal time" is set as the type of the connection state between the information processing apparatuses #i and #j. In this case, the generation unit 503 refers to the color attribute of the basic attribute information 700 to set the output attribute of the output pattern P (color attribute: blue).

Subsequently, the generation unit 503 generates the output pattern P corresponding to the connection state between the information processing apparatuses #i and #j. Specifically, for example, the generation unit 503 randomly generates the output pattern P having a length higher than a pattern length $T_{min}$. Herein, the pattern length $T_{min}$ can be arbitrarily set. For example, a value (for example, 2000 [msec]) to such an extent that it becomes difficult for a person to recognize the output pattern P when the pattern length of the output pattern P is lower than the pattern length $T_{min}$ is set as the pattern length $T_{min}$.

In addition, t_x in the output pattern P is assigned by a multiple of a basis pattern length Tb. The basis pattern length Tb can be arbitrarily set. For example, a value of approximately 100 [msec] is set as the basis pattern length Tb. More specifically, for example, with regard to t_x in the output pattern P, the generation unit 503 assigns "t_x=e×Tb" by using an element e (e ∈ St) randomly selected from a set of coefficients St={1, 3, 5, 8, 10}.

Moreover, the output attribute of the output pattern P (color attribute: blue) is set in attr_x in the output pattern P. It is noted that, herein, the same output attribute (for example, the color attribute: blue) is set in all attr_x, but the configuration is not limited to the above. For example, the generation unit 503 may randomly set the output attribute in accordance with the type of the output apparatus 305 as attr_x in the output pattern P.

Subsequently, the generation unit 503 sets the generated output pattern P as the pattern of the pattern data D. With this configuration, it is possible to generate the pattern data D including the output pattern P corresponding to the connection state between the wirelessly connected information processing apparatuses #i and #j.

The connection state corresponding to the generation target of the pattern data D (output pattern P) may be previously set, for example. As the connection state corresponding to the generation target of the output pattern P, for example, connection completion (normal time), connection end (normal time), connection error (abnormal time), data transmission start (during processing), data transmission end (during processing), opposite device processing start (during processing), opposite device processing end (during processing), opposite device error occurrence (abnormal time), or the like is set.

In addition, each time the detection unit 502 detects a new connection state, the generation unit 503 may generate the pattern data D corresponding to the detected connection state. The data body of the generated pattern data D is stored in the connection state management DB 400 while being associated with the pattern data ID, for example.

In addition, the generation unit 503 may generate the output pattern P corresponding to the connection state with the other information processing apparatus #j such that the output pattern P varies among different connection states with the other information processing apparatus #j. Herein, respective output patterns P corresponding to different connection states between the information processing apparatuses #i and #j are set as an "output pattern Pa" and an "output pattern Pb" (a, b: natural numbers, a≠b).

In this case, the generation unit 503 generates the output pattern Pa with which the difference degree Df between the output patterns Pa and Pb becomes higher than or equal to a threshold γ, for example. The difference degree Df is an index value indicating a degree of a difference between the output pattern Pa and the output pattern Pb. The threshold γ can be arbitrarily set. For example, the threshold γ is set as a value to such an extent that it becomes difficult for the person to recognize the difference between the output patterns Pa and Pb when the difference degree Df becomes lower than the threshold γ. In other words, it can be mentioned that the output patterns Pa and Pb are similar to each other when the difference degree Df between the output patterns Pa and Pb is lower than the threshold γ.

When the output patterns Pa and Pb are represented by the following expressions (1) and (2), the generation unit 503 can calculate the difference degree Df between the output patterns Pa and Pb by using the following expression (3), for example.

$$Pa = [[attr\_0, t\_0, t\_1], [attr\_1, t\_2, t\_3], \ldots, [attr\_n, t\_2n, t\_2n+1]] \quad (1)$$

$$Pb = [[attr\_0, s\_0, s\_1], [attr\_1, s\_2, s\_3], \ldots, \\ [attr\_m, s\_2m, s\_2m+1]] \quad (2)$$

$$Df(P1, P2) = \sqrt{\left(\sum_{i=0}^{2m+1} (t\_i - s\_i)^{\wedge}2\right)} \quad (3)$$

In a case where the difference degree Df is lower than the threshold γ, the generation unit 503 generates the output pattern Pa again, for example. That is, the generation unit 503 repeats the generation of the output pattern Pa (or the output pattern Pb) until the difference degree Df becomes higher than or equal to the threshold γ. With this configuration, it is possible to generate the different output patterns P among the different connection states between the information processing apparatuses #i and #j.

In addition, the generation unit 503 may generate the output pattern P corresponding to the connection state with the other information processing apparatus #j such that a predetermined part from an initial position of the output pattern P becomes common among the different connection states with the other information processing apparatus #j. That is, the common part among the different connection states may be provided to the part at the initial position of the output pattern P corresponding to the connection state with the other information processing apparatus #j.

In the following descriptions, the common part at the initial position of the output pattern P among the different connection states with the other information processing apparatus #j may be referred to as a "pattern prefix Pr" in some cases.

The pattern prefix Pr varies for each information processing apparatus #i, for example. The pattern prefix Pr is generated while being associated with a user ID or a product code of the information processing apparatus #i and stored in the memory 302. The part other than the pattern prefix Pr in the output pattern P is generated while being associated with the connection state with the other information processing apparatus #j.

A pattern length Tp of the pattern prefix Pr can be arbitrarily set. For example, a pattern length corresponding to an approximation of several patterns from the initial position of the output pattern P (for example, [attr_0, t_0, t_1] is one pattern) is set as the pattern length Tp.

The output patterns Pa and Pb described above are used as an example, and a part for two patterns from the initial position of the output pattern Pa is set as the pattern prefix Pr. In this case, the part for the two patterns from the initial position of the output pattern Pb is set as the pattern prefix Pr and becomes [attr_0, t_0, t_1], [attr_1, t_2, t_3], which is the same as the output pattern Pa.

It is noted that a previously generated part while being associated with the connection state between the information processing apparatuses may be used as a part other than the pattern prefix Pr among the output pattern P. With this configuration, in a case where the connection state is the same even when the connection destination is switched, the same pattern is used for the part other than the pattern prefix Pr, and the discrimination of the connection state by the user can be facilitated.

In addition, the generation unit 503 may obtain the output pattern P corresponding to the connection state between the information processing apparatuses used in each of wirelessly communicable information processing apparatuses #k (k≠i, k=1, 2, . . . , n). Herein, the respective wirelessly communicable information processing apparatuses #k refer to peripheral devices existing in a range where a wireless communication can be established with the information processing apparatus #i.

Specifically, for example, the generation unit 503 receives broadcast from the respective wirelessly communicable information processing apparatuses #k to obtain the output patterns P used in the respective information processing apparatuses #k. It is noted that the respective wirelessly communicable information processing apparatuses #k may include, for example, the other information processing apparatus #j wirelessly connected to the information processing apparatus #i.

Subsequently, the generation unit 503 may generate the output pattern P corresponding to the connection state with the other information processing apparatus #j so as to be different from the obtained output patterns P used in the respective information processing apparatuses #k. More specifically, for example, the generation unit 503 generates the output pattern P corresponding to the connection state with the other information processing apparatus #j such that the difference degrees Df from the output patterns P of the respective information processing apparatuses #k are higher than or equal to the threshold γ.

The output control unit 504 transmits the pattern data D corresponding to the connection state with the other information processing apparatus #j generated by the generation unit 503 to the other information processing apparatus #j by using the communication unit 501. In addition, the output control unit 504 causes the other information processing apparatus #j to perform the output in accordance with the timing indicated by the output pattern P, and also performs the output in accordance with the timing indicated by the output pattern P in its own apparatus.

Specifically, for example, the output control unit 504 transmits the output instruction of the output pattern P to the other information processing apparatus #j by using the communication unit 501. The output instruction of the output pattern P includes, for example, the pattern data ID for uniquely identifying the pattern data D including the output pattern P corresponding to the output target. Subsequently, in response to the transmission of the output instruction of the output pattern P, the output control unit 504 performs the output in accordance with the timing indicated by the output pattern P in its own apparatus.

More specifically, for example, the output control unit 504 performs the output in accordance with the timing indicated by the output pattern P by using the output apparatus 305 corresponding to the type of the pattern data D. At this time, for example, in accordance with the timing indicated by the output pattern P, the output control unit 504 performs the output of the output attribute included in the output pattern P described above.

For example, in a case where the type is "led", in accordance with the timing indicated by the output pattern P, the output control unit 504 causes the LED having the color attribute indicated by attr_x included in the output pattern P described above to emit light. In addition, for example, in a case where the type is "sound", in accordance with the timing indicated by the output pattern P, the output control unit 504 performs the sound output of the sound attribute indicated by attr_x included in the output pattern P described above by the speaker.

On the other hand, for example, in response to the reception of the output instruction of the output pattern P, the other information processing apparatus #j performs the output in accordance with the timing indicated by the output pattern P included in the pattern data D of the pattern data ID included in the above-mentioned output specification in its own apparatus.

More specifically, for example, the other information processing apparatus #j performs the output in accordance with the timing indicated by the output pattern P by using the output apparatus 305 corresponding to the type of the pattern data D. At this time, for example, in accordance with the timing indicated by the output pattern P, the other information processing apparatus #j performs the output of the output attribute included in the output pattern P described above.

With this configuration, in both the wirelessly connected information processing apparatuses #1 and #2, it is possible to perform the output in accordance with the timing indicated by the output pattern P corresponding to the connection state between the information processing apparatuses #i and #j.

It is noted that the output timings in the respective information processing apparatuses #i and #j may be synchronized between the information processing apparatuses #i and #j, and also the synchronization may also be avoided. For example, after an elapse of a certain time (for example, approximately a few seconds) since the information processing apparatus #i performs the output, the other information processing apparatus #j may be caused to perform the output.

In addition, after an elapse of a certain time (for example, approximately a few seconds) since the information processing apparatus #i transmits the output instruction to the other information processing apparatus #j, the information processing apparatuses #i and #j may respectively perform the outputs. With this configuration, the output timings in the respective information processing apparatuses #i and #j can be substantially synchronized with each other.

Moreover, in response to the transition of the connection state with the other wirelessly connected information processing apparatus #j, the output control unit 504 performs the output in accordance with the timing indicated by the output pattern P corresponding to the connection state after the transition in its own apparatus. Furthermore, the output control unit 504 causes the other information processing apparatus #j to perform the output in accordance with the timing indicated by the output pattern P corresponding to the connection state after the transition.

Specifically, for example, each time the connection state with the other information processing apparatus #j is detected, the output control unit 504 refers to the connection state management DB 400 and identifies the pattern data ID corresponding to the current connection state with the other information processing apparatus #j. Next, the output control unit 504 trans the output instruction including the identified pattern data ID to the other information processing apparatus #j.

Subsequently, the output control unit 504 performs the output in accordance with the timing indicated by the output pattern P included in the pattern data D of the identified pattern data ID in its own apparatus. With this configuration, in response to the transition of the connection state with the other information processing apparatus #j, both the information processing apparatuses #1 and #2 can perform the output in accordance with the timing indicated by the output pattern P corresponding to the connection state after the transition.

In addition, in response to the acceptance of the output instruction of the output pattern P through the operation input by the user using the input apparatus 304 illustrated in FIG. 3, the output control unit 504 may perform the output in accordance with the timing indicated by the output pattern P corresponding to the current connection state in its own apparatus. In this case, the output control unit 504 also causes the other information processing apparatus #j to perform the output in accordance with the timing indicated by the output pattern P corresponding to the current connection state.

Moreover, the communication unit 501 may receive the pattern data D corresponding to the connection state with the other information processing apparatus #j from the other wirelessly connected information processing apparatus #j. Furthermore, the communication unit 501 may receive the output instruction of the output pattern P from the other information processing apparatus #j. As described above, the output instruction of the output pattern P includes, for example, the pattern data ID of the pattern data D including the output pattern P corresponding to the output target.

In this case, in response to the reception of the output instruction of the output pattern P, the output control unit 504 may perform the output in accordance with the timing indicated by the output pattern P included in the pattern data D of the pattern data ID included in the above-mentioned output specification in its own apparatus. With this configuration, it is possible to perform the output in accordance with the timing indicated by the output pattern P corresponding to the connection state with the other information processing apparatus #j in accordance with the output instruction from the other information processing apparatus #j.

It is noted that there are cases where the information processing apparatus #i does not include the output apparatus 305 of the type indicated by the type of the pattern data D received from the other information processing apparatus #j. In this case, the output control unit 504 may convert the type of the pattern data D to the type of the output apparatus 305 included in its own apparatus and perform the output in accordance with the timing indicated by the output pattern P by the output apparatus 305 of the type after the conversion. With this configuration, even when the information processing apparatus #i does not include the output apparatus 305 of the type specified from the other information processing apparatus #j, it is possible to perform the output in accordance with the timing indicated by the output pattern P by using the output apparatus 305 of the type included in the information processing apparatus #i.

In addition, for example, when the output in accordance with the timing indicated by the output pattern P is performed, the output control unit 504 may display information indicating the connection state with the other information processing apparatus #j on the output apparatus 305 such as the liquid crystal panel or the display. The information indicating the connection state is, for example, a name, an ID, or the like with which the connection state can be identified.

Here, a display example of the information indicating the connection state with the other information processing apparatus #j will be described with reference to FIG. 8. At this time, a case will be described as an example where the information processing apparatus #i includes a display 801 and an LED 802 as the output apparatus 305.

Figure 8:
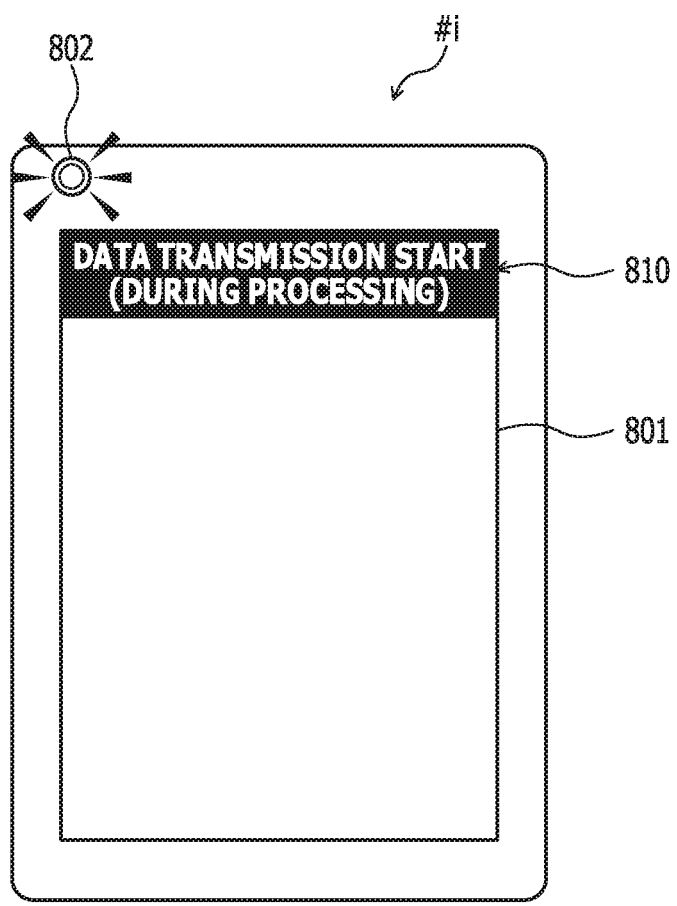
FIG. 8 is an explanatory diagram illustrating a display example of information indicating a connection state with another information processing apparatus.

FIG. 8 is an explanatory diagram illustrating the display example of the information indicating the connection state with the other information processing apparatus #j. In FIG. 8, the display 801 of the information processing apparatus #i displays connection state information 810 indicating the connection state with the other information processing apparatus #j. In addition, the LED 802 of the information processing apparatus #i emits light in accordance with the output timings indicated by the output pattern P corresponding to the connection state with the other information processing apparatus #j.

According to the connection state information 810, the user may find that the connection state corresponding to the light emission pattern of the LED 802 (output pattern P) is "data transmission start (during processing)". With this configuration, even when the user does not grasp the output patterns P corresponding to the respective connection states in advance, the connection state with the other information processing apparatus #j can be grasped. In addition, thereafter, the user can discriminate the connection state with the other information processing apparatus #j by only checking the light emission pattern of the LED 802 (output pattern P).

Information Processing Procedure of the Information Processing Apparatus #i

Next, an information processing procedure of the information processing apparatus #i will be described.

Figure 9:
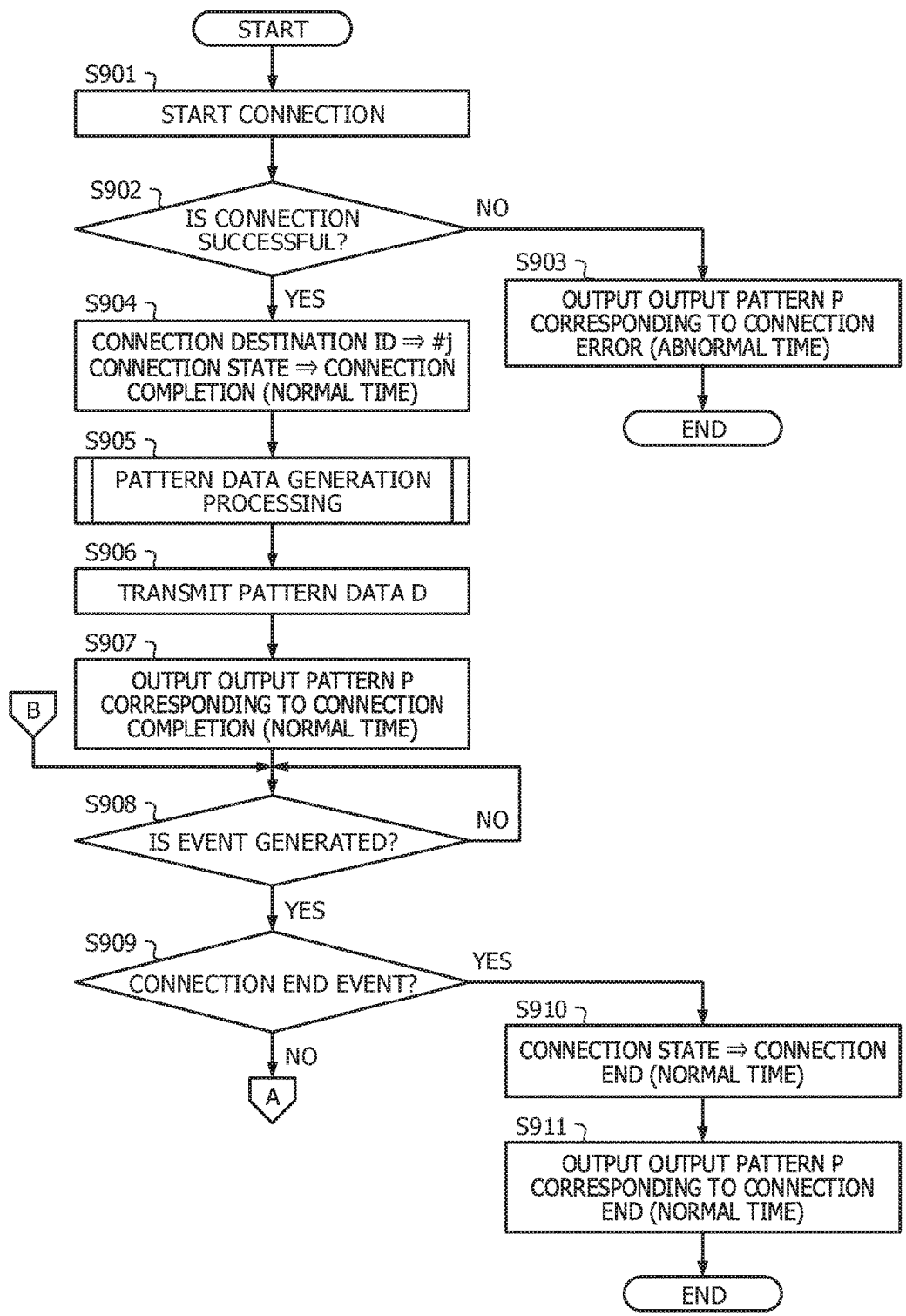
FIG. 9 is a flow chart illustrating an example of an information processing procedure of the information processing apparatus (part 1)
Figure 10:
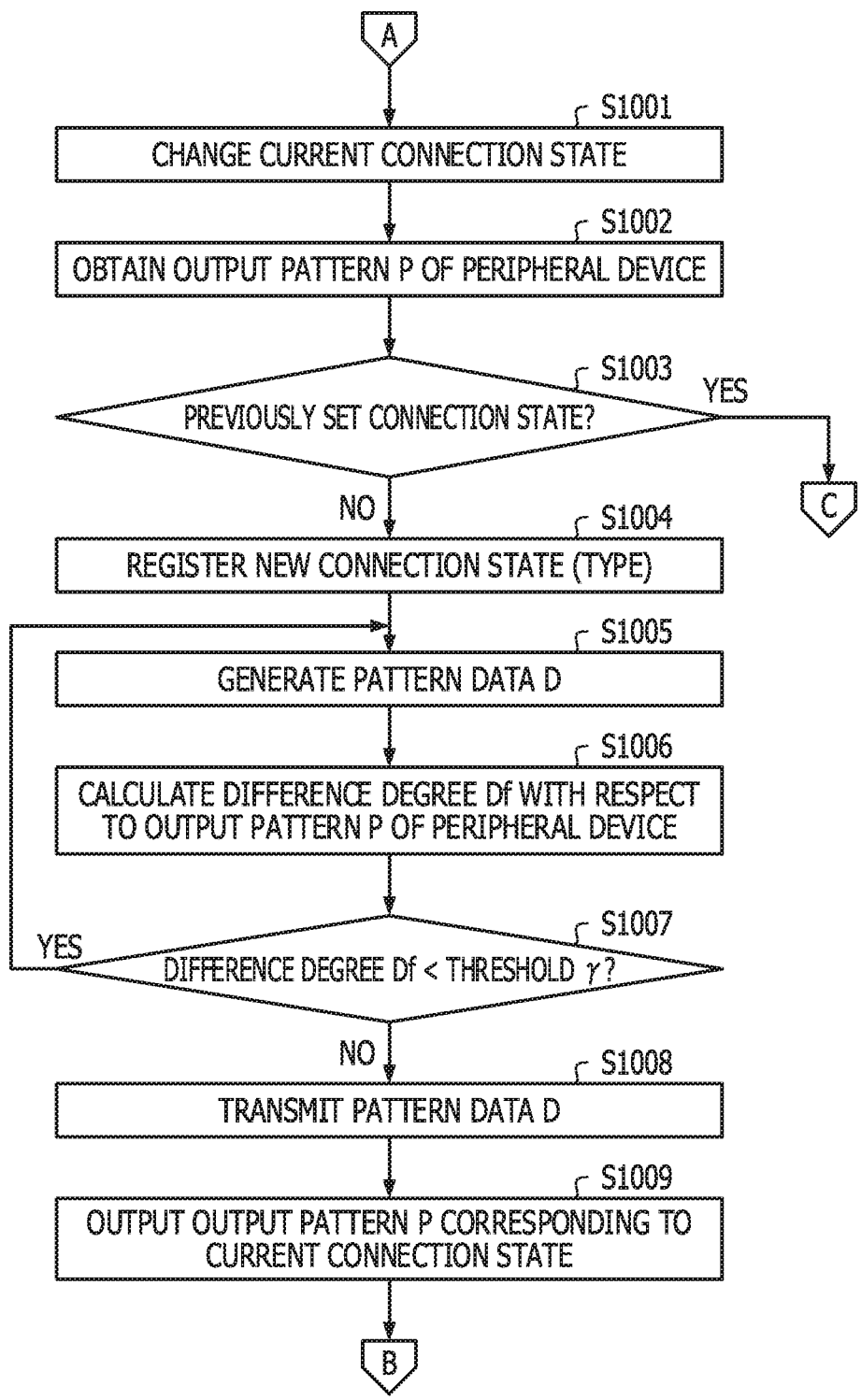
FIG. 10 is a flow chart illustrating the example of the information processing procedure of the information processing apparatus (part 2)
Figure 11:
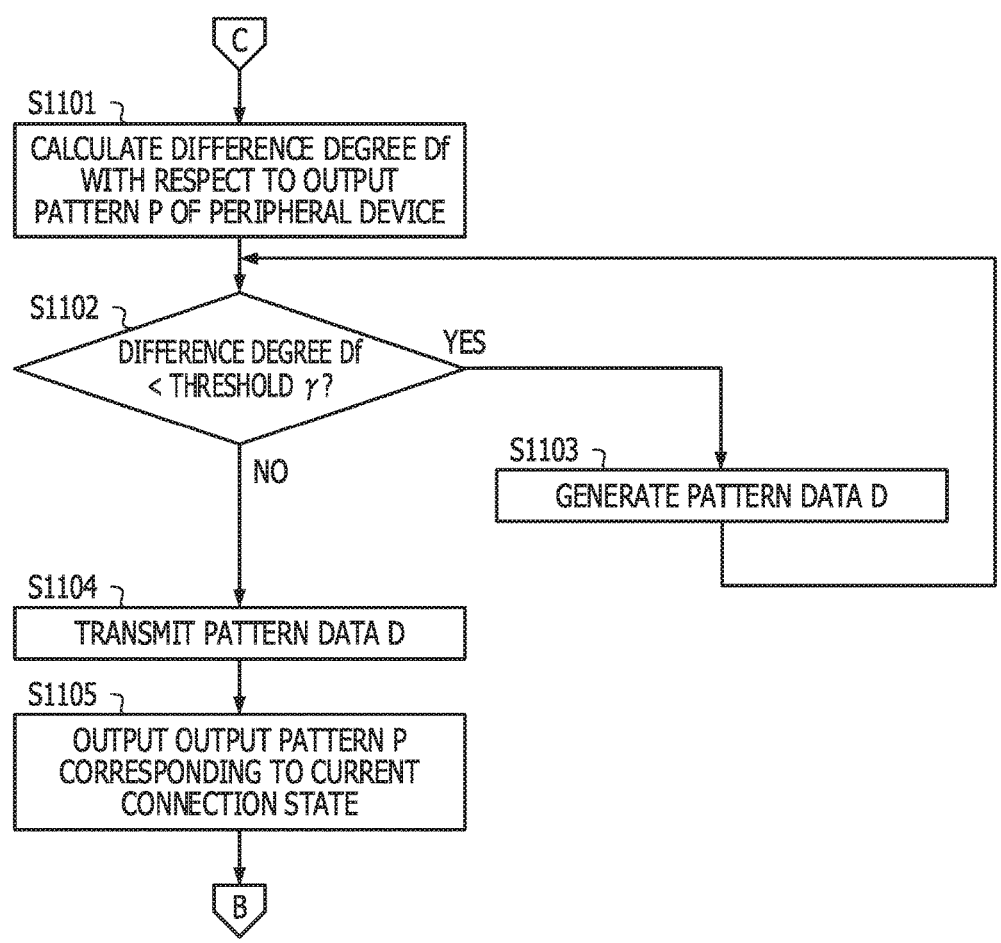
FIG. 11 is a flow chart illustrating the example of the information processing procedure of the information processing apparatus (part 3)

FIG. 9, FIG. 10, and FIG. 11 are flow charts illustrating an example of the information processing procedure of the information processing apparatus #i. In the flow chart of FIG. 9, first, the information processing apparatus #i starts the connection with the other wirelessly communicable information processing apparatus #j (step S901). Next, the information processing apparatus #i determines whether or not the connection with the other information processing apparatus #j succeeds (step S902).

At this time, in a case where, the connection with the other information processing apparatus #j fails (step S902: No), the information processing apparatus #i performs the output in accordance with the timing indicated by the output pattern P corresponding to the connection state "connection error (abnormal time)" with the other information processing apparatus #j (step S903). Subsequently, the information processing apparatus #i ends the series of processing based on the present flow chart.

It is noted that the output pattern P corresponding to the connection state "connection error (abnormal time)" is previously generated and stored in the memory 302, for example.

On the other hand, in a case where the connection with the other information processing apparatus #j succeeds (step S902: Yes), the information processing apparatus #i respectively sets "#j" and "connection completion (normal time)" in the connection destination ID and the current connection state in the connection state management DB 400 (step S904). With this configuration, new connection state management information is stored as a record.

Next, the information processing apparatus #i executes pattern data generation processing for generating the pattern data D corresponding to the connection state with the other information processing apparatus #j (step S905). The connection state corresponding to the generation target of the pattern data D (output pattern P) is previously set. The generated pattern data D is stored in the connection state management DB 400.

A specific processing procedure of the pattern data generation processing will be described below with reference to FIG. 11. It is noted that, when the currently unused pattern data D corresponding to the already generated pattern data D exists, the information processing apparatus #i may reuse the currently unused pattern data D.

Next, the information processing apparatus #i transmits the generated pattern data D to the other information processing apparatus #j together with the output instruction of the output pattern P corresponding to the connection state "connection completion (normal time)" with the other information processing apparatus #j (step S906). Subsequently, the information processing apparatus #i refers to the connection state management DB 400 and performs the output in accordance with the timing indicated by the output pattern P corresponding to the connection state "connection completion (normal time)" with the other information processing apparatus #j (step S907).

Next, the information processing apparatus #i determines whether or not an event is generated (step S908). Herein, the information processing apparatus #i stands by for the generation of the event (step S908: No). Subsequently, in a case where the event is generated (step S908: Yes), the information processing apparatus #i determines whether or not the event is a connection end event (step S909).

At this time, in a case where the event is the connection end event (step S909: Yes), the information processing apparatus #i sets "connection end (normal time)" in the current connection state in the connection state management DB 400 (step S910). Next, the information processing apparatus #i refers to the connection state management DB 400 and performs the output in accordance with the timing indicated by the output pattern P corresponding to the connection state "connection end (normal time)" with the other information processing apparatus #j (step S911). Subsequently, the information processing apparatus #i ends the series of processing based on the present flow chart.

On the other hand, in step S908, in a case where the event is not the connection end event (step S909: No), the information processing apparatus #i shifts to step S1001 illustrated in the flow chart of FIG. 10.

In the flow chart of FIG. 10, first, the information processing apparatus #i changes the current connection state in the connection state management DB 400 to the connection state with the other information processing apparatus #j identified from the event generated in step S908 illustrated in FIG. 9 (step S1001).

Subsequently, the information processing apparatus #i obtains the output patterns P of the peripheral devices (step S1002). It is noted that the peripheral devices refer to the information processing apparatuses #k existing in a range where the wireless communication with the information processing apparatus #i can be performed.

Next, the information processing apparatus #i determines whether or not the current connection state is a previously set connection state (step S1003). At this time, in a case where the current connection state is not the previously set connection state (step S1003: No), the information processing apparatus #i registers a new connection state (type) in the connection state management DB 400 (step S1004).

Subsequently, the information processing apparatus #i generates the pattern data D including the output pattern P corresponding to the new connection state (type) (step S1005). It is noted that, since a specific processing procedure for generating the pattern data D is similar to the pattern data generation processing in step S905 illustrated in FIG. 9, descriptions thereof will be omitted.

Next, the information processing apparatus #i calculates the difference degree Df between the output pattern P included in the generated pattern data D and the output patterns P of the peripheral devices (step S1006). Subsequently, the information processing apparatus #i determines whether or not the calculated difference degree Df is lower than the threshold γ (step S1007).

At this time, in a case where the difference degree Df is lower than the threshold γ (step S1007: Yes), the information processing apparatus #i returns to step S1005. On the other hand, in a case where the difference degree Df is higher than or equal to the threshold γ (step S1007: No), the information processing apparatus #i transmits the generated pattern data D to the other information processing apparatus #j (step S1008).

Subsequently, the information processing apparatus #i refers to the connection state management DB 400 and performs the output in accordance with the timing indicated by the output pattern P corresponding to the current connection state with the other information processing apparatus #j (step S1009), and returns to step S908 illustrated in FIG. 9.

On the other hand, in step S1003, in a case where the current connection state is the previously set connection state (step S1003: Yes), the information processing apparatus #i shifts to step S1101 in the flow chart of FIG. 11.

In the flow chart of FIG. 11, first, the information processing apparatus #i calculates the difference degree Df between the output pattern P corresponding to the current connection state and the output patterns P of the peripheral devices (step S1101). Subsequently, the information processing apparatus #i determines whether or not the calculated difference degree Df is lower than the threshold γ (step S1102).

At this time, in a case where the difference degree Df is lower than the threshold γ (step S1102: Yes), the information processing apparatus #i generates the pattern data D including the output pattern P corresponding to the current connection state (step S1103). It is noted that, since the specific processing procedure for generating the pattern data D is similar to the pattern data generation processing in step S905 illustrated in FIG. 9, descriptions thereof will be omitted.

On the other hand, in a case where the difference degree Df is higher than or equal to the threshold γ (step S1102: No), the information processing apparatus #i refers to the connection state management DB 400 and transmits the pattern data D including the output pattern P corresponding to the current connection state to the other information processing apparatus #j (step S1104).

Subsequently, the information processing apparatus #i refers to the connection state management DB 400 and performs the output in accordance with the timing indicated by the output pattern P corresponding to the current connection state with the other information processing apparatus #j (step S1105), and returns to step S908 illustrated in FIG. 9.

With this configuration, the output in accordance with the timing indicated by the output pattern P corresponding to the connection state between the information processing apparatuses #i and #j can be performed in not only its own apparatus but also the other wirelessly connected information processing apparatus #j.

Specific Processing Procedure of the Pattern Data Generation Processing

Next, a specific processing procedure of the pattern data generation processing in step S905 illustrated in FIG. 9 will be described.

Figure 12:
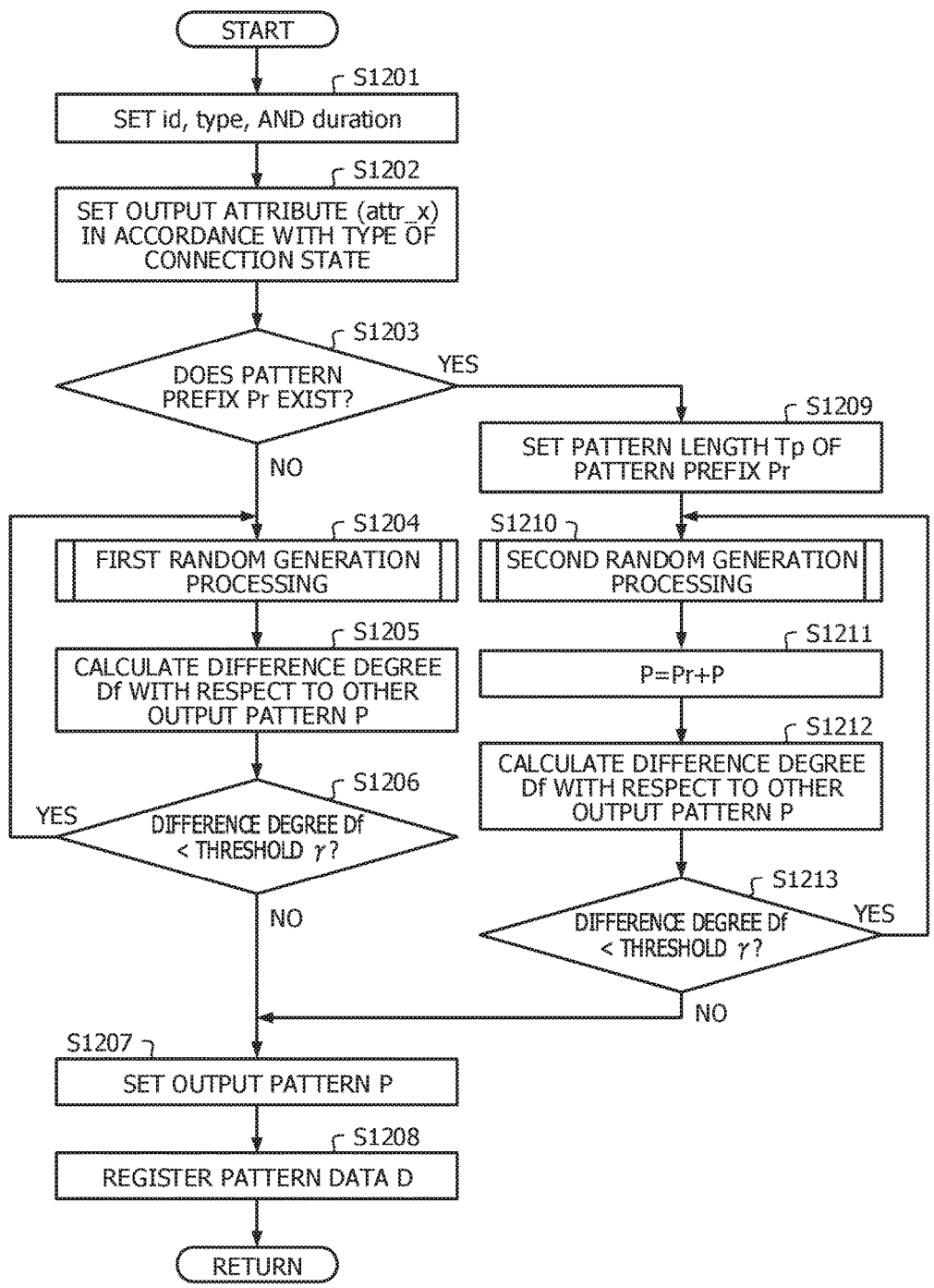
FIG. 12 is a flow chart illustrating an example of a specific processing procedure of pattern data generation processing.

FIG. 12 is a flow chart illustrating an example of the specific processing procedure of the pattern data generation processing. In the flow chart of FIG. 12, first, the information processing apparatus #i sets the id, type, and duration of the pattern data D corresponding to the previously set connection state (step S1201).

Next, the information processing apparatus #i refers to the basic attribute information 700 and sets the output attribute (attr_x) of the output pattern P in accordance with a type of the previously set connection state (step S1202). Subsequently, the information processing apparatus #i determines whether or not the pattern prefix Pr corresponding to the other information processing apparatus #j exists (step S1203).

At this time, in a case where the pattern prefix Pr does not exist (step S1203: No), the information processing apparatus #i executes first random generation processing for randomly generating the output pattern P having a length longer than or equal to the pattern length $T_{min}$ corresponding to the previously set connection state (step S1204). A specific processing procedure of the first random generation processing will be described below with reference to FIG. 13.

Next, the information processing apparatus #i refers to the connection state management DB 400 to calculate the difference degree Df between the generated output pattern P and the other output pattern P (step S1205). Subsequently, the information processing apparatus #i determines whether or not the calculated difference degree Df is lower than the threshold γ (step S1206).

At this time, in a case where the difference degree Df is lower than the threshold γ (step S1206: Yes), the information processing apparatus #i returns to step S1204. On the other hand, in a case where the difference degree Df is higher than or equal to the threshold γ (step S1206: No), the information processing apparatus #i sets the generated output pattern P in the pattern data D corresponding to the previously set connection state (step S1207).

Next, the information processing apparatus #i registers the pattern data D corresponding to the previously set connection state in the connection state management DB 400 (step S1208), and returns to the step in which the pattern data generation processing is called.

On the other hand, in step S1203, in a case where the pattern prefix Pr exists (step S1203: Yes), the information processing apparatus #i sets the pattern length Tp of the pattern prefix Pr (step S1209). Subsequently, the information processing apparatus #i executes second random generation processing for randomly generating the output pattern P longer than or equal to the pattern length ($M_{min}$–Tp) (step S1210).

It is noted that, since a specific processing procedure of the second random generation processing is similar to the first random generation processing in step S1204, descriptions thereof will be omitted.

Next, the information processing apparatus #i puts the pattern prefix Pr and the output pattern P generated in step S1210 together to generate the output pattern P (P=Pr+P) corresponding to the previously set connection state (step S1211).

Next, the information processing apparatus #i refers to the connection state management DB 400 and calculates the difference degree Df between the generated output pattern P and the other output pattern P (step S1212). Subsequently, the information processing apparatus #i determines whether or not the calculated difference degree Df is lower than the threshold γ (step S1213).

At this time, in a case where the difference degree Df is lower than the threshold γ (step S1213: Yes), the information processing apparatus #i returns to step S1210. On the other hand, in a case where the difference degree Df is higher than or equal to the threshold γ (step S1213: No), the information processing apparatus #i shifts to step S1207.

With this configuration, it is possible to generate the output pattern P corresponding to the connection state with the other information processing apparatus #j such that the output pattern P is different from the output pattern P of the peripheral devices and also the output pattern P varies among the different connection states with the other information processing apparatus #j.

Specific Processing Procedure of the First Random Generation Processing

Next, a specific processing procedure of the first random generation processing in step S1204 illustrated in FIG. 12 will be described.

Figure 13:
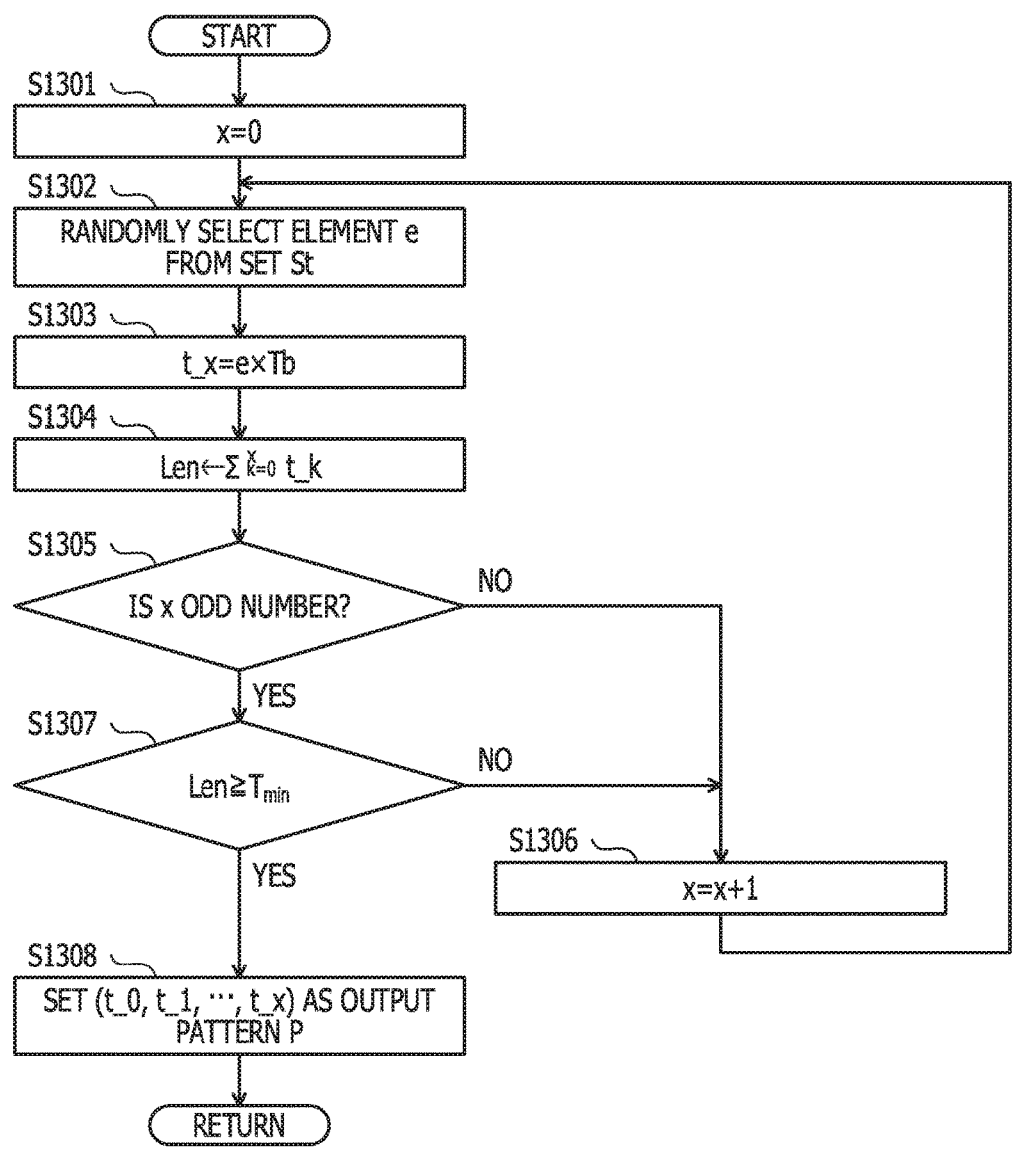
FIG. 13 is a flow chart illustrating an example of a specific processing procedure of first random generation processing.

FIG. 13 is a flow chart illustrating an example of the specific processing procedure of the first random generation processing. In the flow chart of FIG. 13, first, the information processing apparatus #i sets "x" in t_x in the output pattern P as "x=0" (step S1301), and randomly selects the element e from a set of coefficients St={1, 3, 5, 8, 10} (step S1302).

Next, the information processing apparatus #i calculates "t_x=e×Tb" by using the selected element e (step S1303). It is noted that Tb denotes a basic pattern length. Subsequently, the information processing apparatus #i calculates a pattern length Len by using the following expression (4) (step S1304).

$$Len = \Sigma_{k=0}^{x} t\_k \qquad (4)$$

Subsequently, the information processing apparatus #i determines whether or not "x" is an odd number (step S1305). At this time, in a case where "x" is an even number (step S1305: No), the information processing apparatus #i increments "x" in t_x (step S1306), and returns to step S1302.

On the other hand, in a case where "x" is an odd number (step S1305: Yes), the information processing apparatus #i determines whether or not the pattern length Len is higher than or equal to the pattern length $T_{min}$ (step S1307). At this time, in a case where the pattern length Len is lower than the pattern length $T_{min}$ (step S1307: No), the information processing apparatus #i shifts to step S1306.

On the other hand, in a case where the pattern length Len is higher than or equal to the pattern length $T_{min}$ (step S1307: Yes), the information processing apparatus #i sets (t_0, t_1, ..., t_x) as the output pattern P (step S1308), and returns to the step in which the first random generation processing is called.

With this configuration, it is possible to randomly generate the output pattern P higher than or equal to the pattern length $T_{min}$. It is noted that attr_x in the output pattern P becomes the output attribute set in step S1202 illustrated in FIG. 12.

Information Processing Procedure of the Other Information Processing Apparatus #j Next, an information processing procedure of the other information processing apparatus #j will be described.

Figure 14:
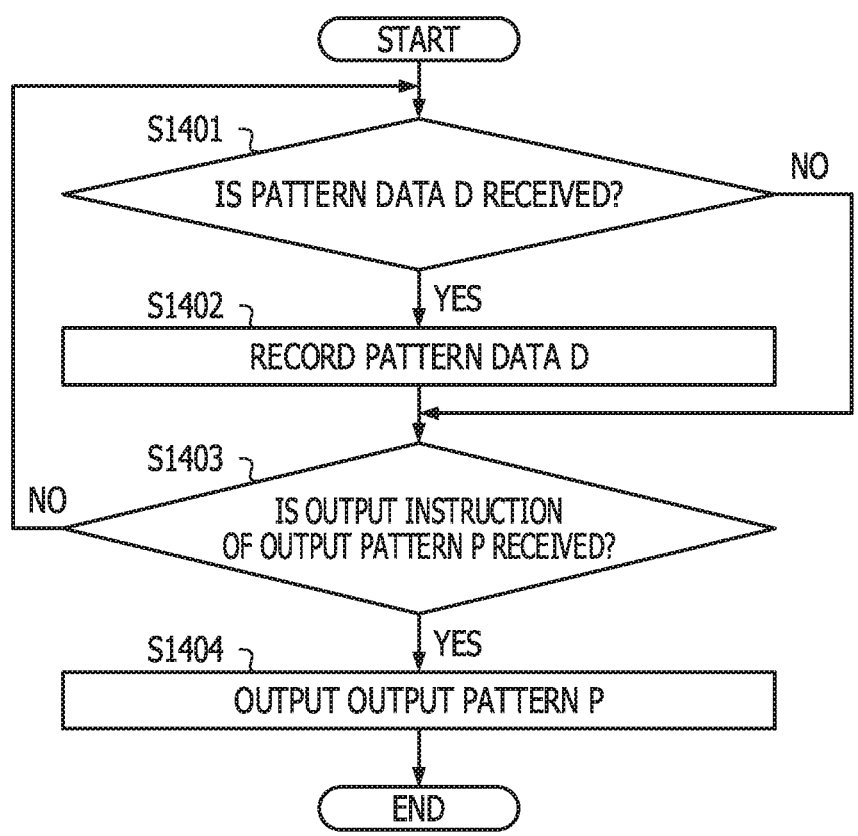
FIG. 14 a flow chart illustrating an example of an information processing procedure of another information processing apparatus.

FIG. 14 is a flow chart illustrating an example of the information processing procedure of the other information processing apparatus #j. In the flow chart of FIG. 14, first, the other information processing apparatus #j determines whether or not the pattern data D corresponding to the connection state with the information processing apparatus #i is received from the wirelessly connected information processing apparatus #i (step S1401).

At this time, in a case where the pattern data D is not received (step S1401: No), the other information processing apparatus #j shifts to step S1403. On the other hand, in a case where the pattern data D is received (step S1401: Yes), the other information processing apparatus #j records the received pattern data D in the memory 302 (step S1402).

Next, the other information processing apparatus #j determines whether or not the output instruction of the output pattern P is received from the wirelessly connected information processing apparatus #i (step S1403). At this time, in a case where the output instruction of the output pattern P is not received (step S1403: No), the other information processing apparatus #j returns to step S1401.

On the other hand, in a case where the output instruction of the output pattern P is received (step S1403: Yes), the other information processing apparatus #j performs the output in accordance with the timing indicated by the output pattern P included in the pattern data D of the pattern data ID included in the above-mentioned output instruction (step S1404), Subsequently, the other information processing apparatus #j ends the series of processing based on the present flow chart.

With this configuration, in accordance with the output instruction from the information processing apparatus #i, it is possible to perform the output in accordance with the timing indicated by the output pattern P corresponding to the connection state with the information processing apparatus #i.

As described above, according to the information processing apparatus #i of the first exemplary embodiment, the pattern data D including the output pattern P corresponding to the connection state with the other wirelessly connected information processing apparatus #j can be generated, and the generated pattern data D can be transmitted to the other information processing apparatus #j. Subsequently, according to the information processing apparatus #i, the other information processing apparatus #j can be caused to perform the output in accordance with the timing indicated by the output pattern P, and it is possible to perform the output in accordance with the timing indicated by the output pattern P in its own apparatus.

With this configuration, it is possible to perform the output in accordance with the timing indicated by the output pattern P corresponding to the connection state between the information processing apparatuses #i and #j in both the wirelessly connected information processing apparatuses #i and #j. For this reason, the connection state between the wirelessly connected information processing apparatuses #i and #j can be visualized, and it is possible to present the connection relationship and the connection state between the information processing apparatuses #i and #j in an easily understandable manner.

In addition, according to the information processing apparatus #i, it is possible to generate the output pattern P corresponding to the connection state with the other information processing apparatus #j such that the output pattern P varies among the different connection states with the other information processing apparatus #j. With this configuration, the output based on the different output pattern P can be performed in accordance with the change in the connection state between the information processing apparatuses #i and #j, and the connection state between the information processing apparatuses #i and #j can be discriminated.

Moreover, according to the information processing apparatus #i, it is possible to generate the output pattern P corresponding to the connection state with the other information processing apparatus #j such that the predetermined part (pattern prefix Pr) from the initial position of the output pattern P becomes common among the different connection states with the other information processing apparatus #j. With this configuration, when the connection destination is the same, the initial part of the output pattern P is output at the same timing, so that the discrimination of the connection destination by the user can be facilitated.

Furthermore, according to the information processing apparatus #i, in response to the transition of the connection state with the other information processing apparatus #j, the output in accordance with the timing indicated by the output pattern P corresponding to the connection state after the transition can be performed in its own apparatus, and also the other information processing apparatus #j can be caused to perform the output in accordance with the timing indicated by the output pattern P corresponding to the connection state after the transition. With this configuration, each time the connection state between the information processing apparatuses #i and #j is changed, that is, any event is generated, the output in accordance with the timing indicated by the output pattern P corresponding to the connection state between the information processing apparatuses #i and #j can be performed. It is noted that, in a case where the other information processing apparatus #j is a printer, for example, a situation where the user forgets to pick up a printed document or the like is detected as an event. Thus, situations including not only a device error but also a human error and the like can be visualized, and it is possible to improve a usability for the user.

In addition, according to the information processing apparatus #i, the pattern data D including the information (type) indicating the type of the output apparatus 305 corresponding to the output pattern P can be transmitted to the other information processing apparatus #j. Then, according to the information processing apparatus #i, the output in accordance with the timing indicated by the output pattern P can be performed by the output apparatus 305 of the type indicated by the information (type) included in the pattern data D in its own apparatus. Moreover, according to the information processing apparatus #i, the output apparatus 305 of the type indicated by the information (type) included in the pattern data D can be caused to perform the output in accordance with the timing indicated by the output pattern P in the other information processing apparatus #j. With this configuration, it is possible to specify which type of the output apparatus 305 is used to perform the output in accordance with the timing indicated by the output pattern P corresponding to the connection state between the information processing apparatuses #i and #j. For example, while a general output device such as an LED or a speaker is specified, it is possible to present the connection relationship and the connection state between the information processing apparatuses #i and #j in an easily understandable manner even without the provision of a highly functional output device.

Moreover, according to the information processing apparatus #i, it is possible to generate the output pattern P including the output attribute (attr) relying on the type of the output apparatus 305 by referring to the basic attribute information 700. Then, according to the information processing apparatus #i, the output of the output attribute (attr) in accordance with the timing indicated by the output pattern P can be performed by the output apparatus 305 of the type indicated by the information (type) included in the pattern data D in its own apparatus. In addition, according to the information processing apparatus #i, the output apparatus 305 of the type indicated by the information (type) included in the pattern data D can be caused to perform the output of the output attribute (attr) in accordance with the timing indicated by the output pattern P in the other information processing apparatus #j. With this configuration, it is possible to facilitate the user to discriminate the types of the connection states such as normal time, during processing, and abnormal time in accordance with the difference in the output attributes such as the colors and the tones. For example, when the user previously grasps such a setting that the color attribute at the normal time is "blue" and the sound attribute is "low-pitched sound", it is possible to discriminate the types of the connection states such as normal, during processing, and abnormal from the colors and the tones at the time of the output.

Furthermore, according to the information processing apparatus #i, the output pattern P corresponding to the connection state between the information processing apparatuses used in the respective wirelessly communicable information processing apparatuses #k can be obtained, and the output pattern P corresponding to the connection state with the other information processing apparatus #j can be generated so as to be different from the obtained output pattern P. With this configuration, a confusion about the output patterns P used in the information processing apparatuses #i and #j and the output patterns P used in the peripheral devices can be avoided, and the discrimination of the connection state between the information processing apparatuses #i and #j can be further facilitated.

In addition, according to the information processing apparatus #i, the output in accordance with the timing indicated by the output pattern P can be performed in response to the acceptance of the output instruction from the user in its own apparatus, and also the other information processing apparatus #j can be caused to perform the output in accordance with the timing indicated by the output pattern P. With this configuration, the user can check the connection state between the information processing apparatuses #i and #j at an arbitrary timing.

Second Exemplary Embodiment

Next, an information processing system 1500 according to a second exemplary embodiment will be described. According to the second exemplary embodiment, a case where the output pattern P corresponding to the connection state between the wirelessly connected information processing apparatuses in a management server 1501 will be described. It is noted that the illustration and descriptions of sections similar to the sections described according to the first exemplary embodiment will be omitted here.

System Configuration Example of the Information Processing System 1500

Figure 15:
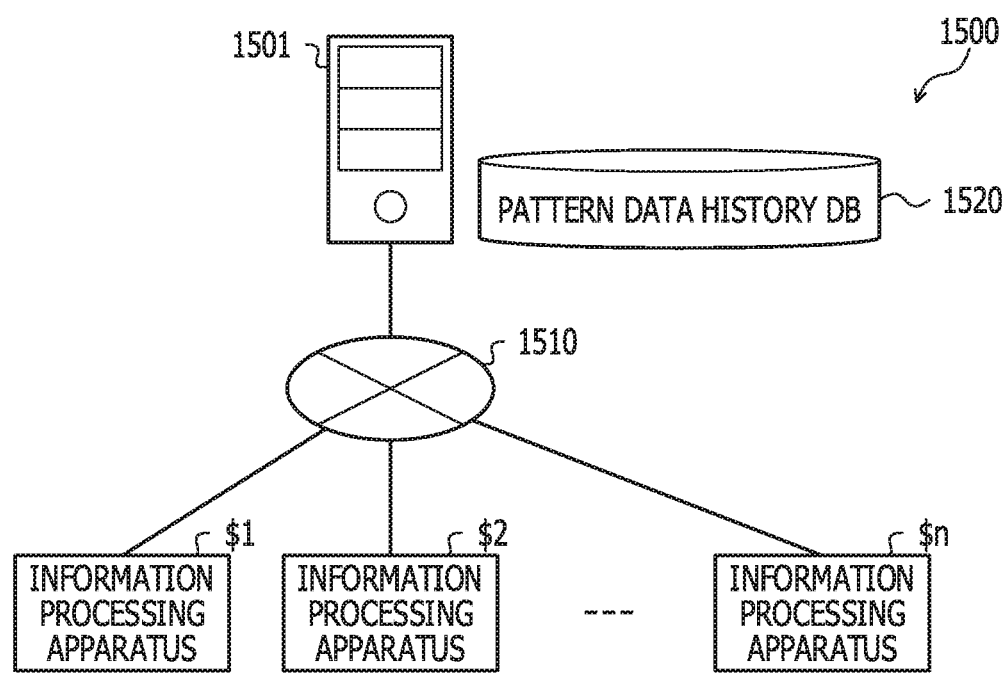
FIG. 15 is an explanatory diagram illustrating a system configuration example of an information processing system.

FIG. 15 is an explanatory diagram illustrating a system configuration example of the information processing system 1500. In FIG. 15, the information processing system 1500 includes the management server 1501 and information processing apparatuses $1 to $n. In the information processing system 1500, the management server 1501 and the information processing apparatuses $1 to $n are connected to one another via a network 1510. The network 1510 is, for example, a short-range wireless network.

The management server 1501 includes a pattern data history DB 1520 and functions as a computer configured to manage the output pattern P corresponding to the connection state between the information processing apparatuses #i and #j. The management server 1501 can wirelessly communicate with the information processing apparatus #i existing in a communication area of the management server 1501. The management server 1501 is, for example, a wireless access point. It is noted that a storage content of the pattern data history DB 1520 will be described below with reference to FIG. 17.

The respective information processing apparatuses $1 to $n are wirelessly communicable computers that can be wirelessly connected to one another. It is noted that hardware configurations of the respective information processing apparatuses $1 to $n are similar to the hardware configuration of the information processing apparatus #i illustrated in FIG. 3, for example, and the illustration and descriptions thereof will be omitted here.

In the following descriptions, an arbitrary information processing apparatus among the information processing apparatuses $1 to $n may be referred to as an "information processing apparatus $i" in some cases (i=1, 2, . . . , n). In addition, another information processing apparatus different from the information processing apparatus $i among the information processing apparatuses $1 to $n may be referred to as an "information processing apparatus $j" in some cases (j≠i, j=1, 2, . . . , n).

Hardware Configuration Example of the Management Server 1501

Figure 16:
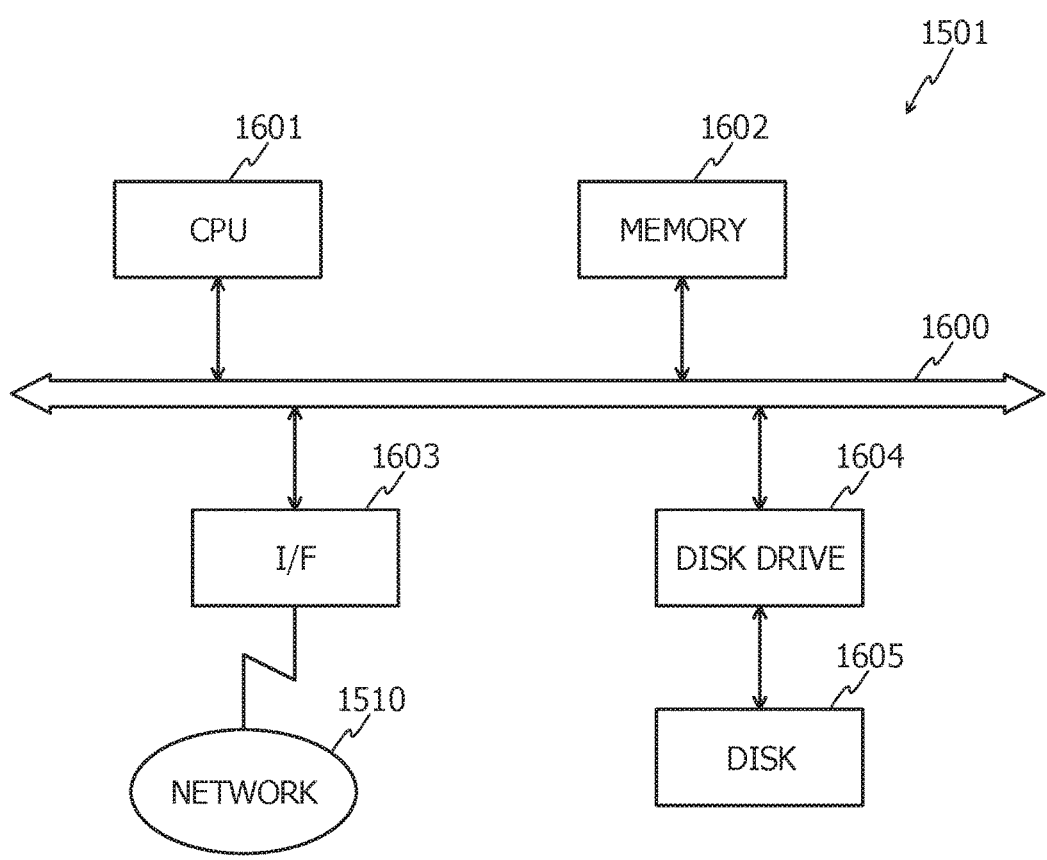
FIG. 16 is a block diagram illustrating a hardware configuration example of a management server.

FIG. 16 is a block diagram illustrating a hardware configuration example of the management server 1501. In FIG. 16, the management server 1501 includes a CPU 1601, a memory 1602, an I/F 1603, a disk drive 1604, and a disk 1605. In addition, the respective components are connected to one another via a bus 1600.

Herein, the CPU 1601 governs control of the entirety of the management server 1501. The memory 1602 includes, for example, a ROM, a RAM, a flash ROM, and the like. Specifically, for example, the flash ROM or the ROM stores various programs, and the RAM is used as a work area for the CPU 1601. The programs stored in the memory 1602 are loaded to the CPU 1601, so that the CPU 1601 is caused to execute coded processing.

The I/F 1603 is connected to the network 1510 and is connected to an external computer (for example, the information processing apparatuses $1 to $n illustrated in FIG. 15) via the network 1510. Subsequently, the I/F 1603 governs an interface between the network 1510 and an internal part of the apparatus and controls input and output of data from the external computer.

The disk drive 1604 controls read and write of the data with respect to the disk 1605 in accordance with control of the CPU 1601. The disk 1605 stores data written by the control of the disk drive 1604. The disk 1605 includes, for example, a magnetic disk, an optical disk, or the like.

It is noted that the management server 1501 may further include, for example, an SSD, a key board, a mouse, a display, and the like in addition to the above-mentioned components.

Storage Content of the Pattern Data History DB 1520

Next, the storage content of the pattern data history DB 1520 included in the management server 1501 will be described. The pattern data history DB 1520 is stored, for example, in the storage apparatus such as the memory 1602 or the disk 1605 illustrated in FIG. 16.

Figure 17:
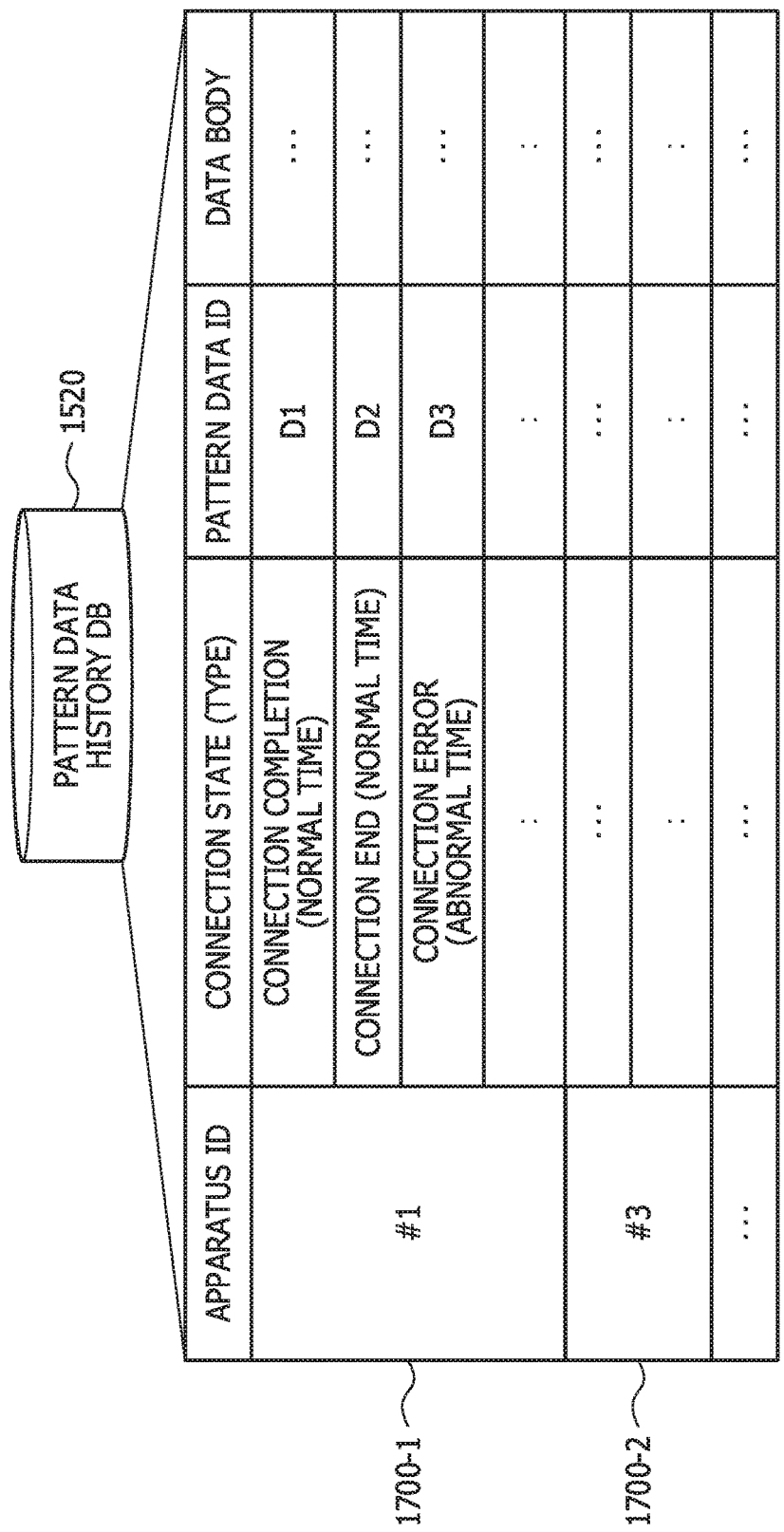
FIG. 17 is an explanatory diagram illustrating an example of a storage content of a pattern data history DB.

FIG. 17 is an explanatory diagram illustrating an example of the storage content of the pattern data history DB 1520. In FIG. 17, the pattern data history DB 1520 includes fields of the apparatus ID, the connection state (type), the pattern data ID, and the data body and sets information in the respective fields, so that pattern data history information (for example, pattern data history information 1700-1 or 1700-2) is stored as a record.

Herein, the apparatus ID is an identifier for uniquely identifying the information processing apparatus $i. A MAC address of the information processing apparatus $i can be used as the apparatus ID, for example. The connection state (type) indicates a connection state between the information processing apparatus $i and the other information processing apparatus $j. The (type) indicates a type of an event functioning as a trigger for transition to this connection state. The pattern data ID is an identifier for uniquely identifying the pattern data D including the output pattern P corresponding to the connection state (type). The data body is a data body of the pattern data D corresponding to the pattern data ID.

Functional Configuration Example of the Information Processing Apparatus $i

Next, a functional configuration example of the information processing apparatus $i according to the second exemplary embodiment will be described.

Figure 18:
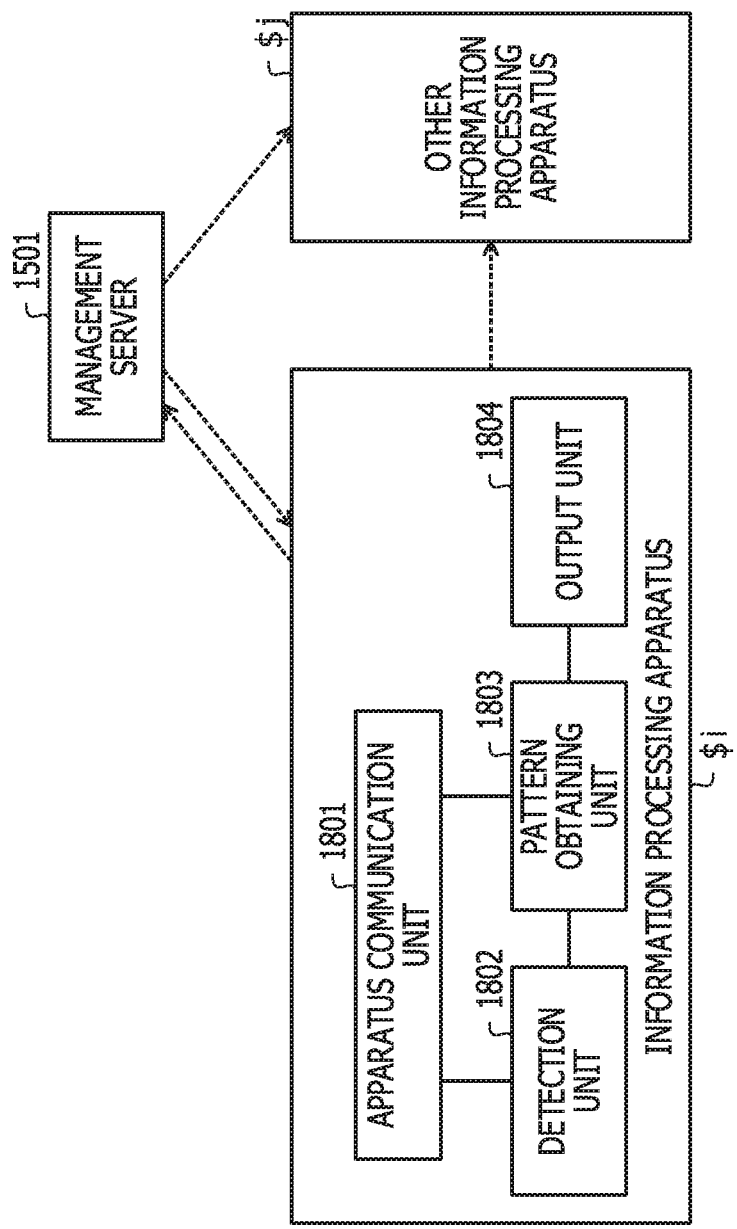
FIG. 18 is a block diagram illustrating a functional configuration example of another information processing apparatus.

FIG. 18 is a block diagram illustrating a functional configuration example of the information processing apparatus $i. In FIG. 18, the information processing apparatus $i has a configuration including an apparatus communication unit 1801, a detection unit 1802, a pattern obtaining unit 1803, and an output unit 1804. The detection unit 1802, the pattern obtaining unit 1803, and the output unit 1804 are functions operating as a control unit, and specifically, for example, the functions are realized while the CPU 301 is caused to execute the programs stored in the memory 302 illustrated in FIG. 3. In addition, the apparatus communication unit 1801 realizes the functions, for example, by the I/F 303 illustrated in FIG. 3. The processing results of the respective function units are stored, for example, in the memory 302.

The apparatus communication unit 1801 has a function of wirelessly communicating with the other information processing apparatus $j. Specifically, for example, when the other wirelessly communicable information processing apparatus $j is detected, the apparatus communication unit 1801 performs connection processing between the information processing apparatuses $i and $j and establishes a wireless connection with the other information processing apparatus $j.

The detection unit 1802 detects the connection state with the other information processing apparatus $j. Specifically, for example, when the connection with the other information processing apparatus $j succeeds, the detection unit 1802 detects the connection state "connection completion" indicating that the connection between the information processing apparatuses $i and $j is normally established. For example, in a case where the event occurs as the trigger for the transition of the connection state with the other information processing apparatus $j, the detection unit 1802 detects the connection state with the other information processing apparatus $j identified from the above-mentioned event.

The pattern obtaining unit 1803 obtains the pattern data D including the output pattern P corresponding to the connection state with the other information processing apparatus $j. Specifically, for example, in response to the detection of the connection state with the other information processing apparatus $j, the pattern obtaining unit 1803 transmits an obtaining request of the pattern data D including the output pattern P corresponding to the above-mentioned connection state to the management server 1501 by using the apparatus communication unit 1801.

Herein, the obtaining request of the pattern data D includes, for example, information for identifying the connection state with the other information processing apparatus $j, the apparatus IDs of the respective information processing apparatuses $i and $j, and the like. Subsequently, the pattern obtaining unit 1803 receives the pattern data D including the output pattern P corresponding to the connection state with the other information processing apparatus $j from the management server 1501 by using the apparatus communication unit 1801 to obtain the pattern data D.

The apparatus communication unit 1801 transmits the pattern data D obtained by the pattern obtaining unit 1803 to the other information processing apparatus $j. It is however noted that, in a case where the pattern data D is transmitted from the management server 1501 to the other information processing apparatus $j, the apparatus communication unit 1801 may avoid the transmission of the pattern data D.

The output unit 1804 performs the output in accordance with the timing indicated by the output pattern P included in the pattern data D obtained by the pattern obtaining unit 1803. It is noted that, since a specific processing content when the output in accordance with the timing indicated by the output pattern P is performed is similar to the processing content of the information processing apparatus #i described according to the first exemplary embodiment, detailed descriptions thereof will be omitted here.

In addition, the apparatus communication unit 1801 may receive the pattern data D corresponding to the connection state with the other information processing apparatus #j from the other wirelessly connected information processing apparatus #j. In this case, the output unit 1804 performs the output in accordance with the timing indicated by the output pattern P included in the received pattern data D.

Functional Configuration Example of the Management Server 1501

Next, a functional configuration example of the management server 1501 according to the second exemplary embodiment will be described.

Figure 19:
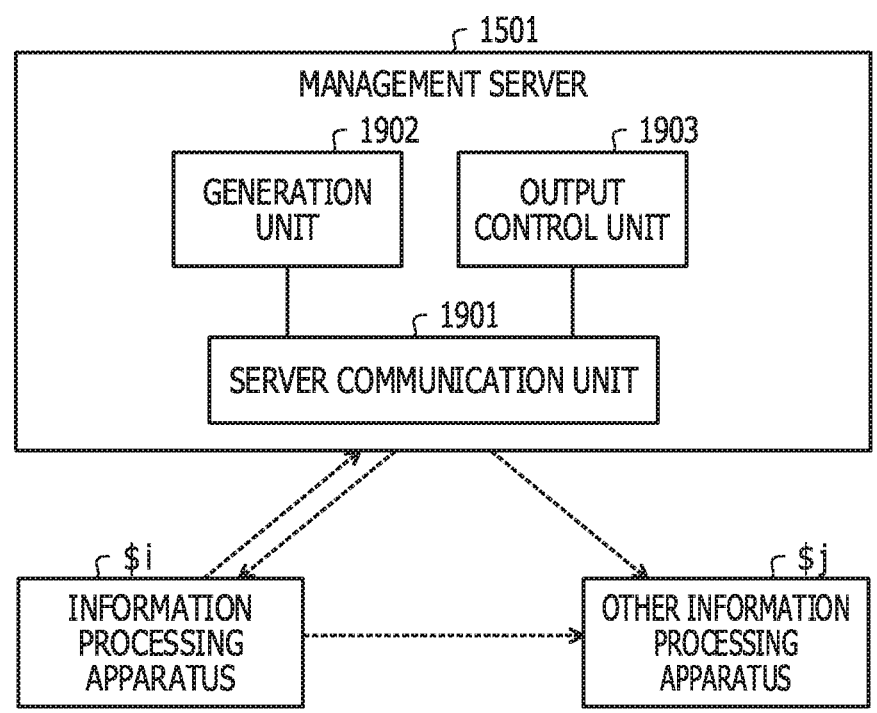
FIG. 19 is a block diagram illustrating a functional configuration example of the management server.

FIG. 19 is a block diagram illustrating the functional configuration example of the management server 1501. In FIG. 19, the management server 1501 has a configuration including a server communication unit 1901, a generation unit 1902, and an output control unit 1903. The generation unit 1902 and the output control unit 1903 are functions operating as a control unit, and specifically, for example, the functions are realized while the CPU 1601 is caused to execute the programs stored in the memory 1602 illustrated in FIG. 16. In addition, the server communication unit 1901 realizes the functions by using, for example, the I/F 1603 illustrated in FIG. 16. The processing results of the respective function units is stored are a storage apparatus such as, for example, the memory 1602 or the disk 1605.

The server communication unit 1901 receives the obtaining request of the pattern data D from the information processing apparatus $i. Herein, the obtaining request of the pattern data D includes, as described above, for example, the information for identifying the connection state with the other information processing apparatus $j, the apparatus IDs of the respective information processing apparatuses $i and $j, and the like.

The generation unit 1902 generates the pattern data D including the output pattern P corresponding to the connection state between the information processing apparatuses $i and $j. Specifically, for example, the generation unit 1902 generates the pattern data D including the output pattern P corresponding to the connection state between the information processing apparatuses $i and $j identified from the received obtaining request of the pattern data D.

It is noted that a specific processing content when the pattern data D is generated is similar to the processing content of the information processing apparatus #i described according to the first exemplary embodiment, and detailed descriptions thereof will be omitted here.

The data body of the generated pattern data D is stored in the pattern data history DB 1520 illustrated in FIG. 17 while being associated with the apparatus ID and the pattern data ID of the information processing apparatus $i, for example.

In addition, the generation unit 1902 may generate the pattern data D including the output pattern P corresponding to the connection state between the information processing apparatuses $i and $j such that the output pattern P varies in all the information processing apparatuses wirelessly communicable with its own station.

Specifically, for example, the generation unit 1902 refers to the pattern data history DB 1520 and searches for the pattern data D including the other output pattern P similar to the output pattern P corresponding to the connection state between the information processing apparatuses $i and $j. It is noted that the determination on whether or not the pattern is similar to the other output pattern P is performed, for example, by using the difference degree Df (it is determined that the pattern is similar when the difference degree Df is lower than the threshold γ) described according to the first exemplary embodiment.

At this time, in a case where the pattern data D including the other output pattern P similar to the output pattern P is searched for, the generation unit 1902 generates the pattern data D including the output pattern P corresponding to the connection state between the information processing apparatuses $i and $j again. That is, the generation of the pattern data D is repeatedly performed until the pattern data D including the other output pattern P similar to the output pattern P is not searched for.

The output control unit 1903 transmits the pattern data D generated by the generation unit 1902 to the information processing apparatus $i by using the server communication unit 1901, and both the information processing apparatuses $i and $j are caused to perform the output in accordance with the timing indicated by the output pattern P. That is, the transmission of the pattern data D to the information processing apparatus $i is equivalent to the output instruction of the output pattern P included in the above-mentioned pattern data D.

It is noted that the output control unit 1903 may transmit the generated pattern data D to both the information processing apparatuses $i and $j. In this case, the transmission of the pattern data D may be avoided from the information processing apparatus $i to the other information processing apparatus $j.

Information Processing Procedure of the Information Processing Apparatus $i

Next, an information processing procedure of the information processing apparatus $i according to the second exemplary embodiment will be described.

Figure 20:
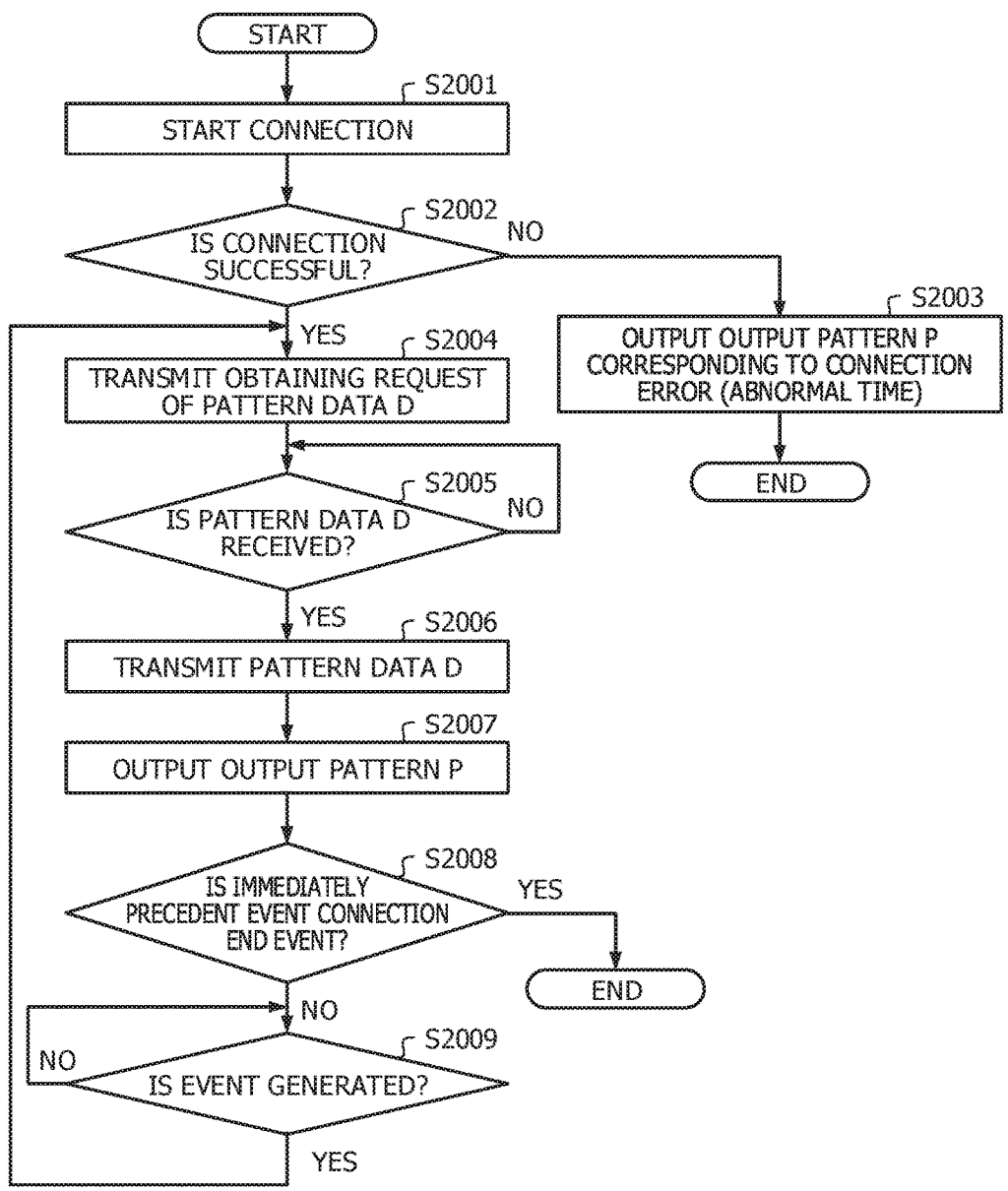
FIG. 20 is a flow chart illustrating an example of an information processing procedure of the information processing apparatus.

FIG. 20 is a flow chart illustrating an example of the information processing procedure of the information processing apparatus $i. In the flow chart of FIG. 20, first, the information processing apparatus $i starts the connection with the other wirelessly communicable information processing apparatus $j (step S2001). Next, the information processing apparatus determines whether or not the connection with the connection with the other information processing apparatus $j succeeds (step S2002).

At this time, in a case where the connection with the other information processing apparatus $j fails (step S2002: No), the information processing apparatus $i performs the output in accordance with the timing indicated by the output pattern P corresponding to the connection state "connection error (abnormal time)" with the other information processing apparatus $j (step S2003). Subsequently, the information processing apparatus $i ends the series of processing based on the present flow chart.

It is noted that the output pattern P corresponding to the connection state "connection error (abnormal time)" is previously stored in the memory 302, for example. However, a query about the output pattern P corresponding to the connection state "connection error (abnormal time)" may be issued to the management server 1501.

On the other hand, in a case where the connection with the other information processing apparatus $j succeeds (step S2002: Yes), the information processing apparatus $i transmits the obtaining request of the pattern data D to the management server 1501 (step S2004). The pattern data D corresponding to the obtaining request target is the pattern data D including the output pattern P corresponding to the connection state with the other wirelessly connected information processing apparatus $j.

Subsequently, the information processing apparatus $i determines whether or not the pattern data D is received from the management server 1501 (step S2005). Herein, the information processing apparatus $i stands by for the reception of the pattern data D (step S2005: No).

Subsequently, in a case where the information processing apparatus $i receives the pattern data D (step S2005: Yes), the received pattern data D is transmitted to the other information processing apparatus $j (step S2006). As a result, the output in accordance with the timing indicated by the output pattern P included in the pattern data D received from the information processing apparatus $i is performed in the other information processing apparatus $j.

Next, the information processing apparatus $i performs the output in accordance with the timing indicated by the output pattern P included in the received pattern data D (step S2007). Subsequently, the information processing apparatus $i determines whether or not the immediately precedent event is the connection end event (step S2008). At this time, in a case where the event is the connection end event (step S2008: Yes), the information processing apparatus $i ends the series of processing based on the present flow chart.

On the other hand, in a case where the event is not the connection end event (step S2008: No), the information processing apparatus $i determines whether or not an event is generated (step S2009). Herein, the information processing apparatus $i stands by for the generation of the event (step S2009: No). Subsequently, in a case where the event is generated (step S2009: Yes), the information processing apparatus $i returns to step S2004.

With this configuration, it is possible to perform the output in accordance with the timing indicated by the output pattern P corresponding to the connection state between the information processing apparatuses $i and $j in both the wirelessly connected information processing apparatuses $1 and $2.

Control Processing Procedure of the Management Server 1501

Next, a control processing procedure of the management server 1501 according to the second exemplary embodiment will be described.

Figure 21:
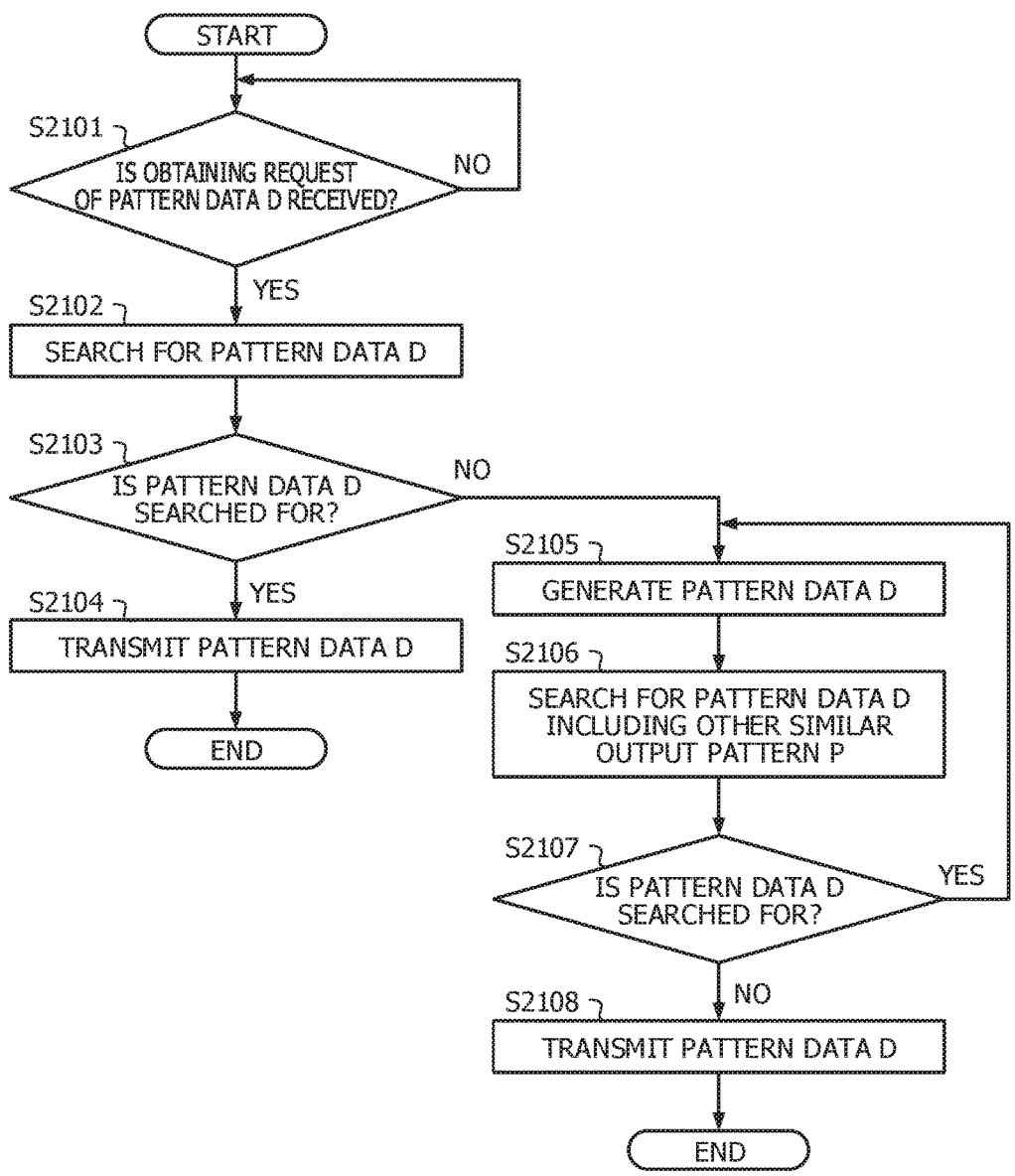
FIG. 21 is a flow chart illustrating an example of a control processing procedure of the management server.

FIG. 21 is a flow chart illustrating an example of a control processing procedure of the management server 1501. In the flow chart of FIG. 21, first, the management server 1501 determines whether or not the obtaining request of the pattern data D is received from the information processing apparatus $i (step S2101). Herein, the management server 1501 stands by to receive the obtaining request of the pattern data D (step S2101: No).

Subsequently, in a case where the obtaining request of the pattern data D is received (step S2101: Yes), the management server 1501 searches the pattern data history DB 1520 for the pattern data D including the output pattern P corresponding to the connection state between the information processing apparatuses $i and $j identified from the above-mentioned obtaining request (step S2102).

Next, the management server 1501 determines whether or not the pattern data D is searched for from the pattern data history DB 1520 (step S2103). At this time, in a case where the pattern data D is searched for (step S2103: Yes), the management server 1501 transmits the searched pattern data D to the information processing apparatus $i (step S2104), and ends the series of processing based on the present flow chart.

On the other hand, in a case where the pattern data D is not searched for (step S2103: No), the management server 1501 generates the pattern data D including the output pattern P corresponding to the connection state between the information processing apparatuses $i and $j (step S2105), It is noted that the specific processing procedure for generating the pattern data D is similar to the pattern data generation processing in step S905 illustrated in FIG. 9, and descriptions thereof will be omitted.

Next, the management server 1501 refers to the pattern data history DB 1520 and searches for the pattern data D including the other output pattern P similar to the output pattern P included in the generated pattern data D (step S2106). Subsequently, the management server 1501 determines whether or not the pattern data D including the other output pattern P is searched for (step S2107).

At this time, in a case where the pattern data D including the other output pattern P is searched for (step S2107: Yes), the management server 1501 returns to step S2105. On the other hand, in a case where the pattern data D including the other output pattern P is not searched for (step S2107: No), the management server 1501 transmits the generated pattern data D to the information processing apparatus $i (step S2108), and ends the series of processing based on the present flow chart.

With this configuration, the pattern data D including the output pattern P corresponding to the connection state between the information processing apparatuses $i and $j can be generated or searched for and transmitted to the information processing apparatus $i. It is noted that the management server 1501 may transmit the pattern data D to the information processing apparatus $j wirelessly connected to the information processing apparatus $i in step S2104 and step S2108.

As described above, according to the information processing system 1500 of the second exemplary embodiment, it is possible to generate the output pattern P corresponding to the wirelessly connected connection state between the information processing apparatuses $i and $j in the management server 1501. With this configuration, as compared with a case where the output pattern P corresponding to the connection state between the information processing apparatuses $i and $j is generated in each of the information processing apparatuses $i, it is possible to simplify the configurations of the respective information processing apparatuses $i.

In addition, according to the management server 1501, the pattern data D including the output pattern P corresponding to the connection state between the information processing apparatuses $i and $j can be generated such that the output pattern P varies in all the information processing apparatuses wirelessly communicable with its own station. With this configuration, the output patterns P are not overlapped with one another in the mutual information processing apparatuses existing in the wirelessly communicable range of the management server 1501, and the discrimination of the connection state between the information processing apparatuses $i and $j can be facilitated.

It is noted that the information processing method described according to the present exemplary embodiment is realized while a previously prepared program is executed by a computer such as a personal computer or a work station. The present information processing program is recorded in a computer-readable recording medium such as a hard disk, a flexible disk, a CD-ROM, a magneto-optical disk (MO), a digital versatile disk (DVD), or a universal serial bus (USB) memory and executed when the computer reads out the information processing program by the computer. In addition, the present information processing program may be distributed by a network such as the internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus, comprising:
a specified output device;
a memory configured to store a plurality of output patterns for output by the specified output device; and
a processor coupled to the specified output device and the memory, the processor configured to:
establish a wireless connection between the wireless communication apparatus and each of a plurality of other wireless communication apparatuses;
determine a status of a first wireless connection, between the wireless communication apparatus and a first wireless communication apparatus of the plurality of other wireless communication apparatuses, based on a connection state of the first wireless connection and an identifier of the first wireless communication apparatus;

select an output pattern, from the memory, based on the status of the first wireless connection and corresponding to the first wireless communication apparatus;

transmit information indicating the output pattern to the first wireless communication apparatus; and control the specified output device to output the output pattern.

2. The wireless communication apparatus according to claim 1, wherein the output pattern is generated by processor and then stored in the memory.

3. The wireless communication apparatus according to claim 1, wherein the first wireless communication apparatus includes another specified output device that is configured to output the output pattern indicated by the information transmitted to the first wireless communication apparatus.

4. The wireless communication apparatus according to claim 3, wherein each of the specified output device and the other specified output device is a light emitting diode (LED) or a speaker device.

5. The wireless communication apparatus according to claim 1, wherein the output pattern is selected so as to be associated with the first wireless connection between the wireless communication apparatus and the first wireless communication apparatus.

6. The wireless communication apparatus according to claim 1, wherein the output pattern is selected so as to indicate that the first wireless connection between the wireless communication apparatus and the first wireless communication apparatus has been established in a wireless communication network.

7. The wireless communication apparatus according to claim 3, wherein the output pattern output by the specified output device is the same as the output pattern output by the other specified output device.

8. A wireless communication method, comprising:
storing, in a memory of a wireless communication apparatus, a plurality of output patterns for output by a specified output device;

establishing, by a processor of the wireless communication apparatus, a wireless connection between the wireless communication apparatus and each of a plurality of other wireless communication apparatuses;

determining a status of a first wireless connection, between the wireless communication apparatus and a first wireless communication apparatus of the plurality of other wireless communication apparatuses, based on a connection state of the first wireless connection and an identifier of the first wireless communication apparatus;

selecting an output pattern, by the processor from the memory, based on the status of the first wireless connection and corresponding to the first wireless communication apparatus;

transmitting information indicating the output pattern to the first wireless communication apparatus; and controlling a specified output device to output the output pattern.

9. A non-transitory computer readable storage medium that stores a program that causes a wireless communication apparatus to execute a process comprising:
storing, in a memory of the wireless communication apparatus, a plurality of output patterns for output by a specified output device;

establishing a wireless connection between the wireless communication apparatus and each of a plurality of other wireless communication apparatuses;

determining a status of a first wireless connection, between the wireless communication apparatus and a first wireless communication apparatus of the plurality of other wireless communication apparatuses, based on a connection state of the first wireless connection and an identifier of the first wireless communication apparatus;

selecting an output pattern, from the memory, based on the status of the first wireless connection and corresponding to the first wireless communication apparatus;

transmitting information indicating the output pattern to the first wireless communication apparatus; and controlling the specified output device to output the output pattern.

10. The wireless communication apparatus according to claim 3, wherein each of the specified output device and the other specified output device is incapable of outputting natural language.

11. The wireless communication apparatus according to claim 1, wherein the processor is further configured to:
determine a second status of a second wireless connection, between the wireless communication apparatus and a second wireless communication apparatus of the plurality of other wireless communication apparatuses, based on a second connection state of the second wireless connection and a second identifier of the second wireless communication apparatus;

select a second output pattern, from the memory, based on the second status of the second wireless connection and corresponding to the second wireless communication apparatus, the second output pattern being different from the output pattern;

transmit second information indicating the second output pattern to the second wireless communication apparatus; and control the specified output device to output the second output pattern.

12. The wireless communication apparatus according to claim 1, wherein the second wireless communication apparatus includes another specified output device that is configured to second output the output pattern indicated by the second information transmitted to the second wireless communication apparatus.

13. The wireless communication apparatus according to claim 12, wherein each of the specified output device and the other specified output device is a light emitting diode (LED) or a speaker device.

14. The wireless communication apparatus according to claim 12, wherein the second output pattern output by the specified output device is the same as the second output pattern output by the other specified output device.

* * * * *